(12) United States Patent
Fishberg

(10) Patent No.: US 10,074,144 B2
(45) Date of Patent: Sep. 11, 2018

(54) AMENITY, SPECIAL SERVICE AND FOOD/BEVERAGE SEARCH AND PURCHASE BOOKING SYSTEM

(71) Applicant: Keith Fishberg, New York, NY (US)

(72) Inventor: Keith Fishberg, New York, NY (US)

( * ) Notice: Subject to any disclaimer, the term of this patent is extended or adjusted under 35 U.S.C. 154(b) by 0 days.

(21) Appl. No.: 15/657,919

(22) Filed: Jul. 24, 2017

(65) Prior Publication Data
US 2017/0323402 A1   Nov. 9, 2017

Related U.S. Application Data

(63) Continuation of application No. 15/021,386, filed as application No. PCT/US2014/055717 on Sep. 15, 2014.
(Continued)

(51) Int. Cl.
| | |
|---|---|
| *G06Q 50/12* | (2012.01) |
| *G06Q 10/02* | (2012.01) |
| *G06Q 30/06* | (2012.01) |
| *G06Q 50/14* | (2012.01) |
| *G06Q 30/02* | (2012.01) |

(Continued)

(52) U.S. Cl.
CPC ............ *G06Q 50/12* (2013.01); *G06F 17/20* (2013.01); *G06F 17/30864* (2013.01); *G06N 99/005* (2013.01); *G06Q 10/02* (2013.01); *G06Q 10/025* (2013.01); *G06Q 30/0283* (2013.01); *G06Q 30/0613* (2013.01); *G06Q 50/14* (2013.01);
(Continued)

(58) Field of Classification Search
CPC .... G06Q 10/02; G06Q 30/0283; G06Q 50/14; G06Q 10/025; G06Q 30/0613; G06Q 50/12
See application file for complete search history.

(56) References Cited

U.S. PATENT DOCUMENTS

| | | | |
|---|---|---|---|
| 8,060,412 B2 | 11/2011 | Rosenbaum et al. | |
| 2004/0260659 A1* | 12/2004 | Chan | G06Q 10/02 705/400 |

(Continued)

OTHER PUBLICATIONS

Niemann et al, "Enhancing Hotel Search with Semantic Web Technologies", Journal of Theoretical and Applied Electronic Commerce Research, vol. 3. Issue 2, Aug. 2008. p. 82-96 (Year: 2008).*

(Continued)

*Primary Examiner* — Kevin H Flynn
*Assistant Examiner* — Brian A Tallman
(74) *Attorney, Agent, or Firm* — Gottlieb, Rackman & Reisman, P.C.

(57) ABSTRACT

The present invention relates to systems, methods and computer program products for an a la carte amenity, special service, food/beverage and accommodation feature search and booking engines. Aspects of the present invention allow customers to identify, via arbitrary search, amenities and/or special services (including food/beverage) available at lodging facilities, restaurants clubs/lounges/bars, dwellings and travel accommodation venues. Customers are thereby presented with goods and services matching or related to their query items and are permitted to select and common desired feature options and book, reserve or purchase their selection; optionally including the booking of an accommodation such as a room or table at a restaurant as well.

20 Claims, 23 Drawing Sheets

Related U.S. Application Data

(60) Provisional application No. 61/992,714, filed on May 13, 2014, provisional application No. 61/936,869, filed on Feb. 6, 2014, provisional application No. 61/877,941, filed on Sep. 13, 2013.

(51) Int. Cl.
  *G06F 17/30* (2006.01)
  *G06F 17/20* (2006.01)
  *G06N 99/00* (2010.01)
  *G06F 17/27* (2006.01)

(52) U.S. Cl.
  CPC ...... *G06F 17/2785* (2013.01); *G06F 17/2795* (2013.01)

(56) References Cited

U.S. PATENT DOCUMENTS

| | | |
|---|---|---|
| 2008/0065617 A1 | 3/2008 | Burke et al. |
| 2008/0319803 A1 | 12/2008 | Heyraud et al. |
| 2009/0216633 A1* | 8/2009 | Whitsett ............... G06Q 30/02 705/14.36 |
| 2011/0071865 A1 | 3/2011 | Leeds et al. |
| 2011/0213784 A1 | 9/2011 | Udupa et al. |
| 2012/0089480 A1 | 4/2012 | Fusz |
| 2012/0290340 A1* | 11/2012 | Ramanujam ........... G06Q 10/02 705/5 |
| 2013/0031506 A1* | 1/2013 | Diaz .................. G06F 17/3087 715/781 |
| 2013/0041696 A1 | 2/2013 | Richard |
| 2013/0074115 A1 | 3/2013 | Hyde et al. |
| 2013/0081093 A1 | 3/2013 | Cassidy et al. |
| 2013/0124564 A1* | 5/2013 | Oztekin ............. G06F 17/3087 707/770 |
| 2013/0132137 A1 | 5/2013 | Norrid |
| 2013/0191216 A1 | 7/2013 | Predescu et al. |
| 2013/0212089 A1 | 8/2013 | Lederer et al. |
| 2013/0304526 A1* | 11/2013 | Boyd .................... G06Q 10/02 705/5 |

OTHER PUBLICATIONS

PCT International Search Report and PCT Written Opinion of the International Search Authority dated Apr. 7, 2015, and International Preliminary Report on Patentability Chapter I dated Mar. 15, 2016 issued in corresponding PCT International Application No. PCT/US14/55717.

International Search Report, US Patent and Trademark Office, Application No. PCT/US2014/055717, dated Apr. 7, 2015.

Written Opinion of the International Searching Authority, US Patent and Trademark Office, Application No. PCT/US2014/055717, dated Apr. 7, 2015.

* cited by examiner

| Rates (07/25/13 – 07/26/13) | | Close Window ☒ |
|---|---|---|
| Amenity Types | Thu | Fri |
| Helicopter<br>12:30PM – 2:30PM<br>6PM – 12AM | $969.30<br>$1,000.00 | $969.30<br>$1,000.00 |
| Spa<br>6AM – 12PM<br>2PM – 5PM | $200.00<br>$325.00 | $300.00<br>$400.00 |
| Roof Deck<br>4AM – 12PM<br>12PM – 4AM | X<br>$25.00 | X<br>$50.00 |

| Room Rates (4 Nights 07/25/13 – 07/28/13) | | | | Close Window ☒ |
|---|---|---|---|---|
| Room Types | Thu | Fri | Sat | Sun |
| Bunk | ☒ | ☒ | ☒ | ☒ |
| Mini | $287.20 | $239.20 | $159.20 | $159.20 |
| Small-Full | $379.00 | $319.00 | $219.00 | $249.00 |
| Medium Full | $449.00 | $369.00 | $269.00 | $299.00 |
| Medium King | ☒ | ☒ | ☒ | ☒ |
| Medium Double | ☒ | ☒ | ☒ | ☒ |
| Large | $529.00 | $469.00 | $369.00 | $399.00 |
| Loft Room | $1,879.00 | $1,819.00 | $1,719.00 | $1,749.00 |

| Room Rates (1 Night 07/25/13 – 07/26/13) | Close Window ☒ |
|---|---|
| Room Types | Thu |
| Bunk | ☒ |
| Mini | ☒ |
| Small-Full | ☒ |
| Medium Full | $449.00 |
| Medium King | ☒ |
| Medium Double | $599.00 |
| Large | $649.00 |
| Loft Room | $1,999.00 |

FIG. 21

Reservation Details

SAMPLE HOTEL
111 West 111st Street, Manhattan, NY 11111
Rooftop Helicopter Service
2 Adults / 0 Children
Check In: 12:30 p.m. July 25, 2013
Check Out: 02:30 p.m. July 25, 2013

+Add Room  +Add Amenity
+Add Service  +Add Food/Bev

Subtotal: US $969.30
Tax recovery charges and service fees US $174.51
Total: US $ 1,143.51

(Rates listed are based on double occupancy per room unless otherwise indicated by user input and exclude tax recovery charges and service fees. In order to guarantee your room, this reservation requires a non-refundable fee of $5.00 at time of reservation.)

Information
Reservation ID: 3yww4r
Customer Confirmation number: 6dc01
Date created: July 25, 2013, 9:51 a.m.

Concierge Instructions
1) Please make sure to add-on champagne service for outset of flight
2) I would like to reserve a cancellable small meeting room upon my return to the facility

Actions: Rooftop Helicopter
[Send confirmation email]  [Extend Reservation]

extend by 30 min.
extend by 1 hour
extend by 1 hour 30 min

Guests
Keith Fishberg

Hotel Policy
Check-In Time: 16:00:00
Check-Out Time: 11:00:00
Deposit: None

Cancellation Policy
Please cancel up to 12 hours in advance for a 50% refund of your purchase price.

FIG. 22

Plan Trip > Search > Helicopter

AFFILIATE NAME | MANHATTAN, NY

Affiliate Description...

Example Affiliate Logo

Amenities

All Rooms
Wireless Internet
Fitness Center
LCD TV
iPod Dock Station
Mini Bar
In-Room Safe
Chauffeur Hotel Amenities
Lobby Bar
The Rooftop
Chowder House
Pool Deck
Meeting Space
Parking
Rooftop Helicopter

Hotel Location

Click here for larger view

Trip Details

Check In: 07/25/2013
Check Out: 07/25/2013

1 Adults Children
+Add  2    0

Type
Rooftop Helicopter
Ave./Night: $969.30
Subtotal: US $969.30    BOOK IT!

Item Details (Rates listed are based on double occupancy per sale unless otherwise indicated by user input & exclude tax recovery charges and service fees.)

Rooftop Helicopter Service

Our rooftop helicopter service is unparalleled in air transportation. Once you fly with use, you will never want to ...
read more

Billing Confirmation

When you book with Boutique Mate, rest assured that every detail of your stall will be our first priority.

Trip Summary

*Example Affiliate Logo*

Guest Information

2430

--Select a Guest--
--Select a Guest--
--Select a Guest--

SAMPLE HOTEL
111 West 111st Street, Manhattan, NY 11111
Rooftop Helicopter Service
2 Adults / 0 Children
Check In: 12:30 p.m. July 25, 2013
Check Out: 02:30 p.m. July 25, 2013

Add/Edit

2410

Billing Information

2420

First name | Last name
Address line 1 | Address line 2
City | State
xxx | xxx-xxxx | Postal Code
Credit Card Type | American Express
Card Number | XXXX XXXX XXXX XXXX
Expiration Date | xx | 2013
CVC | xxx Subtotal: US $969.30
Tax recovery & service fees US $174.51
Total: US $ 1,143.51

☑ I accept Terms of Service and Property policies.

Book Your Trip

(Rates listed are based on double occupancy per room unless otherwise indicated by user input and exclude tax recovery charges and service fees. In order to guarantee your room, this reservation requires a non-refundable fee of $5.00 at time of reservation.)

Cancellation Policy
We understand that sometimes your travel plans change. We do not charge a change or cancel fee. However, this property (Brand1) imposes the following penalty to its

2440

Hotel Concierge Instructions

FIG. 24

Trip Summary

2405 — *Example Affiliate Logo*

SAMPLE HOTEL
111 West 111st Street
Manhattan, NY 11111
United States

2410 — Helicopter
Check In:   12:30 p.m. July 25, 2013
Check Out:  2:30 p.m. July 25, 2013
Edit/Delete
          Subtotal:      US $969.30
Medium Full
1 Nights / 1 Rooms
1 Rooms / 0 Children
Check In:              July 25, 2013
Check Out:             July 25, 2013
Edit/Delete
          Subtotal:      US $449.00
+Add Room      +Add Amenity +Add Service   +Add Food/Bev
Tax recovery & service fees:   US $106.36
                   Total:   US $ 1,524.66

2412 — ☑ I accept Terms of Service and Property policies, Amenity Policies

Book Your Trip

2414 — (Rates listed are based on double occupancy per room unless otherwise indicated by user input and exclude tax recovery charges and service fees. In order to guarantee your room, this reservation requires a non-refundable fee of $5.00 at time of reservation.)

2416 brackets the above section.

Helicopter – Cancellation Policy
Please allow for 12 hours notice prior to cancellation to avoid 50% penalty.

Helicopter – Hotel Policy
Check-In Time: 04:30 PST
Check-Out Time: 06:30 PST

Medium Full Room – Cancellation Policy
CXL BY 1500 HOTEL TIME ON 24JUL13-FEE 1 NIGHT. CANCEL BY 3PM 24 HOURS PRIOR TO ARRIVAL TO AVOID PENALTY
Cancellation Penalty: US $518.73
Cancellation fee: US $0.00

Medium Full Room – Hotel Policy
Check-In Time 11:00 AM
Check-Out Time: 11:00 AM
Deposit: None
Guarantee: GUAR TYPES – AX DS JC CA IK VI
GUARANTEE CREDIT CARDS: AX DS JC CA VI.

2418 brackets the policies section.

FIG. 25

AMENITY, SPECIAL SERVICE AND FOOD/BEVERAGE SEARCH AND PURCHASE BOOKING SYSTEM

CROSS-REFERENCE TO RELATED APPLICATIONS

This application is a continuation application of U.S. patent application Ser. No. 15/021,386, filed on Mar. 11, 2016, which is a National Phase Application of PCT/US2014/055717, filed Sep. 15, 2014, which claims benefit of U.S. Provisional Application Nos. 61/877,941, filed Sep. 13, 2013, 61/936,869, filed Feb. 6, 2014 and 61/992,714, filed May 13, 2014. The contents of each of which are hereby incorporated by reference in their entireties.

TECHNICAL FIELD

The present invention relates to systems, methods and computer program products for amenity, special service and food/beverage searching and purchasing booking engines in hospitality and travel applications.

BACKGROUND ART

In the field of travel accommodations searching and booking, customers are presented with many options. Travel websites such as Orbitz, Expedia, and Travelocity permit customers to search for room accommodations in a given locale for a given date or range of dates. For example, a customer seeking a room accommodation on New Year's eve in New York City might visit such a website and enter or select "New York, N.Y." in a "city" or "destination" field on the page and enter or select a check-in date of December 31 and a check-out date of January 1. The website would then use the customer's information to search its database for rooms available in New York for those days, presenting a list of hotels with bookable rooms. However, if the customer is seeking certain features, most hospitality or travel websites require the customer to read the detailed description of each of the hotels listed in the search results in order to determine whether the features are offered at any of them. Additionally, even if it can be determined that a particular listed hotel generally offers the feature, these web sites offer no provisions for determining whether the desired feature will actually be available and no provisions for actually reserving, booking or paying for the feature with or without a room booking.

Other travel websites, such as hotels.com, BookIt.com and Google Hotel Finder, offer a similar accommodation search dialog and similarly display search results for hotels in a particular location with available rooms in the desired period. These sites differ, however, from other sites in that hotels listed on the search results page may be "filtered" by the customer, who may choose to have displayed only results matching additional criteria, such as being in a particular neighborhood or having certain general amenities. Filter selections are made by the customer by way of drop-down or check-box selections; however, only a limited selection of general amenities is provided. For example, Google Hotel Finder's amenity filter list includes only air-conditioned, bar, beach access, business center, gym, internet, parking, pets allowed, pools, restaurant, accessible facilities, children welcome, laundry and room service. Hotels.com's list has similar amenity filters and adds a few more, including free breakfast, cribs available, and spa. Free-form feature search, i.e., permitting the customer to enter or type a desired amenity, special service or food/beverage into search input form, is not provided. However, even if the customer limits display of search results to hotels meeting these certain limited criteria, the customer is not provided an opportunity to determine availability, much less book or reserve, a particular amenity with a room booking. In fact, Google Hotel Finder and another hotel amenity search web site employing the check-box approach, juicyhotels.com, do not even provide for room bookings through the site. Customers must perform the room booking through the hotel's web site, another travel web site such as BookIt.com, Travelocity or Orbitz, or through a non-web-based means.

OpenTable, a restaurant search web site, offers a similar customer interface. Customers select a general location such as a city or neighborhood and a time in addition to a date. The site will search for available accommodations and present a list of restaurants matching the selection criteria and availability. Similarly to some of the hotel search sites, Open Table offers customers the ability to filter the results list based on additional criteria such as cuisine style and price range. OpenTable can also display lists of restaurants having "private dining facilities" such as chef's tables, function rooms and private dining rooms. However, customers cannot directly determine availability or price or book such private dining features through the web site. Customers are provided a phone number and contact name or can use a web page form-based inquiry. UrbanSpoon, another restaurant search web site, additionally offers customers a list of selectable restaurant "items" including "private parties" and "live music" for filtering restaurant lists; however, there is also no provision for determining availability or price of those items for a given date and time or for booking a table with the item. As with the other hospitality or travel web sites, there is no free-form arbitrary search and purchase function for features. Customers are limited to filtering results according to pre-selected items and amenities.

Yet another system, Orion from Ascension Software, is a web-based platform used by hotels to provide guests online access to room service and amenities gift ordering. However, Orion does not permit arbitrary feature searching or purchasing. Rather, Orion provides "catalogs" of amenities and services available for ordering. Additionally, Orion does not offer the possibility of booking or reserving a room in conjunction with ordering amenities or services.

Accordingly, there is a need for an a la carte hospitality/travel and accommodations system that provides customers the option to search and purchase features within or separate from accommodation venues having desired, bookable/ticketable amenities and/or special services and/or food/beverage available for the desired date(s) and time(s) and the additional capability to book/purchase such features with the capability, but not the requirement of booking an a la carte accommodation such as a room or table at a restaurant. Additionally, there is a need for customers to be able to enter free-form, arbitrary search items to query for desired features.

DISCLOSURE OF THE INVENTION

The present invention relates to systems, methods and computer program products for an a la carte amenity, special service, food/beverage and accommodation ("feature") search and booking engines. Aspects of the present invention allow customers to identify, via arbitrary search, amenities and/or special services (including food/beverage) available at lodging facilities, restaurants, clubs/lounges/ bars, dwellings and travel accommodation venues. In this sense, "arbitrary" means the customer can enter search inputs other than those provided in a check-box list or other predetermined list. Customers are presented with goods and services matching or related to their query items and are permitted to select and confirm desired feature options and book, reserve or purchase their selection; optionally including the booking of an accommodation such as a room or table at a restaurant as well.

According to one embodiment of the invention, there is provided a system for identifying and booking features from a hospitality/travel provider having a processor, a network interface coupled to a network, a feature database stored on a non-transitory computer readable medium, a non-transitory storage medium storing processor instructions and an interface coupling the processor, storage medium, feature database and network interface. The feature database contains feature artifacts associating a bookable amenity, special service or food/beverage item with a hospitality/travel provider. The processor instructions cause the processor to receive, over the network, arbitrary feature identity information for a bookable feature from a client device; search the feature database for a match, at least in part; transmit one or more hospitality/travel provider identities associated with the matches; receive a hospitality/travel provider selection from the client device; and transmit for display on the client device an offer to the client to book a feature based on the arbitrary feature identity information and/or the selected hospitality/travel provider.

In another embodiment, the processor instructions further instruct the processor to, in response to receiving arbitrary feature identity information, in part or in whole, search the feature database for feature artifacts having a feature identity at least partially matching the arbitrary feature identity information and transmit the feature identities associated with at least one of the partially matching artifacts to the client device for display on the client device in an autocomplete list.

In another embodiment, the processor instructions further instruct the processor to receive, from the client device, accommodation search constraints, including an indication of a desired booking period for an accommodation and an indication of a desired geographic location for a hospitality/travel provider. The search of the feature database may be further constrained to those hospitality/travel providers within the desired geographic location and able to provide an accommodation or the bookable feature during the desired booking period; accommodation search constraints may also include a desired room configuration. In one embodiment, the processor instructions further instruct the processor to transmit, through the network, to an external provider, a booking query based on the accommodation search constraints and receive from the external provider availability information for at least one accommodation provider satisfying the accommodation search constraints. The external provider may be a GDS provider, a CRS provider, CRM system, inventory system, sales/revenue management system, loyalty system, property/operations system, or an accommodation provider's PMS. The processor instructions may further include instructions to cause the processor to receive, from the client device, an indication of an acceptance of the offer to book and payment information; transmit the payment information to a payment processor, update an inventory record in the database to record the booking of the feature and/or accommodation, and transmit a confirmation of the booking to the client device.

In another embodiment, the processor instructions further instruct the processor to receive, through the network from a network connected affiliate device, a hospitality provider amenity identity and store an artifact associating said hospitality amenity identity with an identity of said hospitality provider in the amenity database.

In another embodiment of the invention, there is provided a computer implemented method for identifying and booking features from a hospitality provider having a step of transmitting, via a network from a network connected client device to a network connected server, arbitrary feature identity information for a bookable feature. The method includes a step of receiving from the server on the client device, one or more hospitality/travel provider identities of hospitality/travel providers able to provide a bookable features corresponding to the arbitrary feature identity information; transmitting to the server from the client device, an indication of a selected hospitality provider identity; and receiving for display on the client device, an offer to the client to book the feature associated with the feature identity matching the arbitrary feature identity information and/or an accommodation of the selected hospitality/travel provider.

The method may further include steps of transmitting from the client device, a partial arbitrary feature identity and receiving on the client device, amenity identities corresponding to the partial arbitrary feature identity for display on the client device in an autocomplete list.

The method may include a step of transmitting from the client device to the server, accommodation search constraints indicating a desired booking period for an accommodation and a desired geographic location for a hospitality/travel provider. The one or more hospitality/travel provider identities correspond to hospitality/travel providers within the desired geographic location and able to provide an accommodation or the bookable feature during the desired booking period. The search constraints may indicate a desired room configuration.

The method may further include steps of transmitting from the client device to the server, an acceptance of the offer to book and payment information and receiving, by the client device, a confirmation of the booking.

In yet another embodiment of the invention, there is provided a computer program product for identifying and booking features from hospitality and travel providers, comprising a non-transitory computer readable medium storing processor instructions. The instructions instruct the processor to receive, through a network, arbitrary feature identity information for a bookable amenity and/or special service and/or food/beverage from a client device. The instructions also include instructions for searching a feature database for a set of feature artifacts having a feature identity matching, at least in part, the arbitrary feature identity information. The feature database is stored on a non-transitory computer readable medium and comprises feature artifacts associating bookable feature identities with hospitality/travel provider identities. The instructions also include instructions for transmitting to the client device hospitality/travel provider identities associated with the set of feature artifacts and receiving from the client device, a selection of a hospitality/travel provider identity and transmitting to the client device for display, an offer to the client to book the feature associated with the feature identity matching the arbitrary feature identity information and/or an accommodation of the selected hospitality/travel provider.

In yet another embodiment of the invention, there is provided a computer program product for identifying and booking features from providers, comprising a non-transitory computer readable medium storing processor instructions. The instructions instruct the processor to receive, through a network, arbitrary features identity information for a bookable amenity and/or special service and/or food/beverage from a client device. The instructions also include instructions for searching a feature database for a set of feature artifacts having a feature identity matching, at least in part, the arbitrary feature identity information. The feature database is stored on a non-transitory computer readable medium and comprises feature artifacts associating bookable feature identities with provider identities. The instructions also include instructions for transmitting to the client device provider identities associated with the set of feature artifacts and receiving from the client device, a selection of a provider identity and transmitting to the client device for display, an offer to the client to book the feature associated with the feature identity matching the arbitrary feature identity information and/or an accommodation of the selected provider. In one embodiment, the providers may be hospitality providers. In another embodiment, the providers may be travel providers.

In yet another embodiment of the invention, there is provided a computer implemented method for identifying and booking features from a hospitality/travel provider having a step of receiving, through a network, arbitrary features identity information for a bookable amenity from a network connected client device. There is also a step of searching a features database for a set of feature artifacts having a feature identity matching, at least in part, the arbitrary feature identity information, the feature database stored on a non-transitory computer readable medium and comprising a plurality of feature artifacts associating a bookable feature identity with a hospitality/travel provider identity. There are also steps of transmitting, through the network to the client device, one or more hospitality/travel provider identities associated with the set of feature artifacts, receiving, from the client device, a selected hospitality/travel provider identity, and transmitting to the client device an offer to the client to book the feature associated with the feature identity matching the arbitrary feature identity information and/or an accommodation of the selected hospitality/travel provider.

In some embodiments, the hospitality providers and/or travel providers are boutique hotels. In some embodiments, feature identity information includes location information derived from a geolocation or proximity of the client device. In some embodiments, the amenity database is searched using semantic matching technologies. In some embodiments, a bookable feature is an amenity and/or special service and/or food/beverage. In some embodiments, the feature identity information may identify a plurality of features.

BRIEF DESCRIPTION OF THE DRAWINGS

Many aspects of the present disclosure can be better understood with reference to the following drawings. In the drawings, like reference numerals designate corresponding parts throughout the several views.

FIGS. 16, 17, 18, 19, 20 and 21 are details of exemplary screen shots of a customer user portal's search results and item selection pages in accordance with an exemplary embodiment of the invention.

FIG. 22 is an exemplary screen shot of a customer user portal's affiliate profile page in accordance with an exemplary embodiment of the invention.

FIG. 23 is a partial exemplary screen shot of a customer user extension component in accordance with an exemplary embodiment of the invention.

FIGS. 24 and 25 are portions of exemplary screen shots of a customer user portal's confirmation page in accordance with an exemplary embodiment of the invention.

MODES FOR CARRYING OUT THE INVENTION

Figure 2:
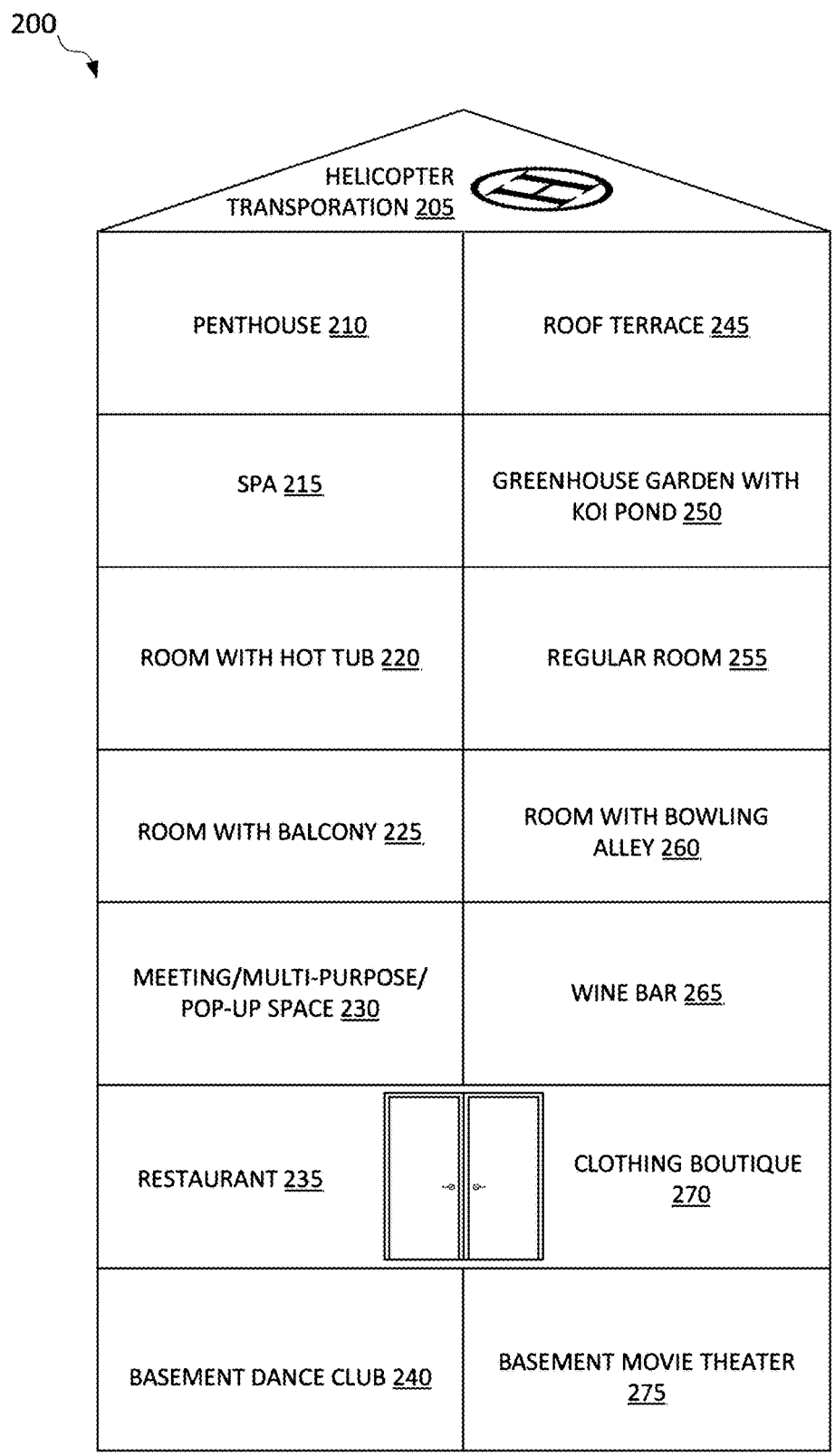
FIG. 2 illustrates an exemplary venue.

Aspects of the present invention relate to systems, methods and computer program products for features such as amenity, special service, food/beverage and accommodation search and booking engines. In the context of the present invention, affiliates are generally hospitality and travel providers such as places of lodging facilities, restaurants, clubs/lounges/bars, dwellings and travel accommodation venues. However, in some embodiments, affiliates may be limited to boutique hotels. Travel providers are generally entities providing travel related products and services. The term "accommodation" pertains to the core offerings of a hospitality provider; for example, hotel accommodations include rooms and restaurant accommodations include restaurant table. With reference to FIG. 2, an affiliate hotel 200 may offer many features such as amenities and/or special services and/or food/beverage. For example, room accommodations may include a penthouse suite 210, a room with hot tub 220, a room with balcony 225, a room with bowling alley 260 and regular rooms 255. Affiliate hotel 200 may also feature a heli-pad 205, roof terrace 245, spa 215, greenhouse garden with koi pond 250, wine bar 265, restaurant 235, clothing boutique 270, dance club 240 and movie theater 275.

Affiliate hotel 200 may also offer meeting and multi-purpose or pop-up space 230. Some travel providers and hospitality providers may make available activities such as boat rentals or experiences such as theater shows. The term "customers" includes persons searching for the products and services of affiliates.

Figure 1:
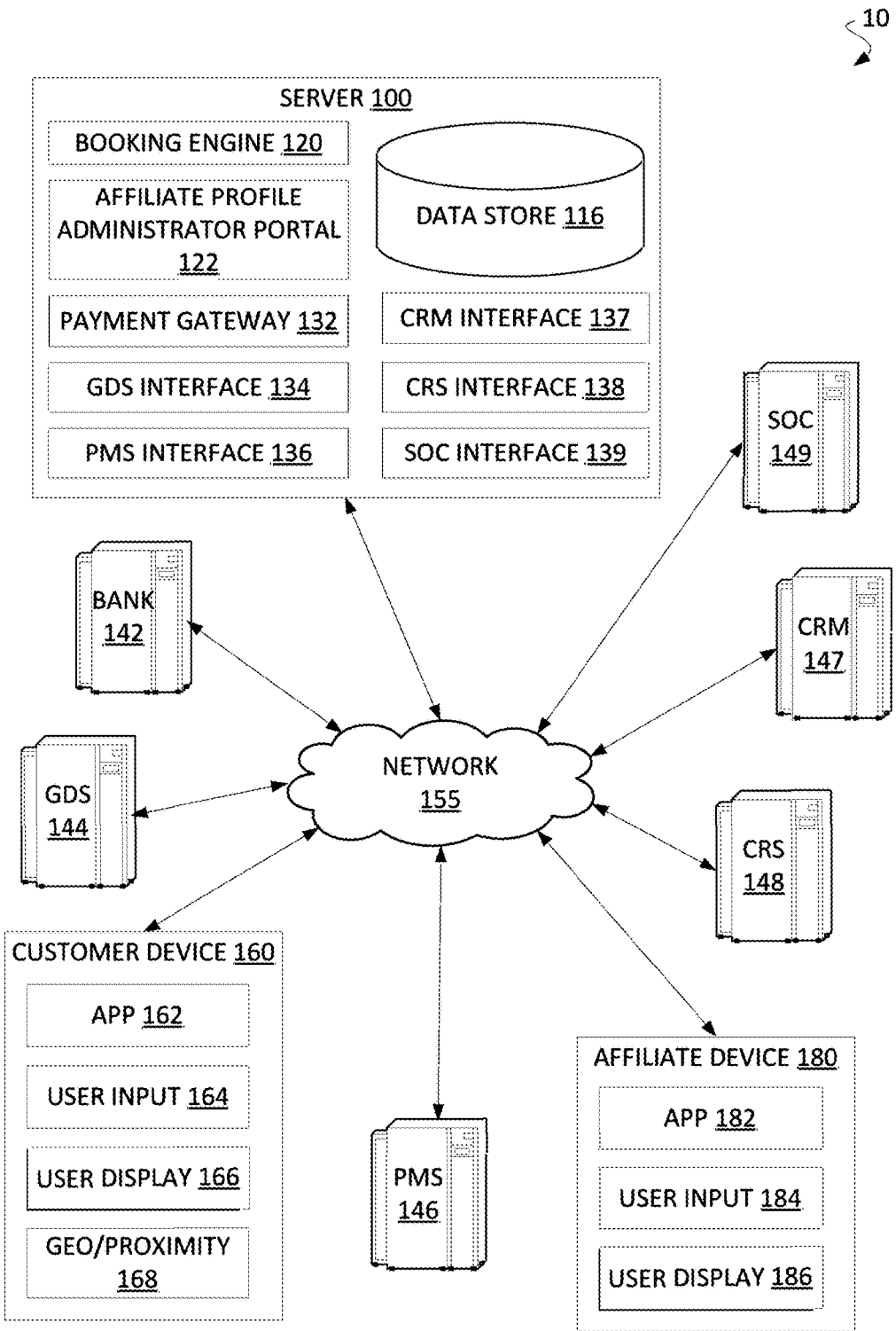
FIG. 1 is a schematic illustration of an exemplary system according to embodiments of the invention.

With reference to FIG. 1, in one embodiment, the invention may be disposed to operate in a networked system 10 comprising a server 100, customer device(s) 160 and affiliate device(s) 180, all interconnected through network 155. Network 155 may include the internet, but may also be comprised of dedicated and/or proprietary network interconnections. The system 10 may also include service provider systems such as Global Distribution System (GDS) 144, Property Management System(s) (PMS) 146, Customer Relationship Management System (CRM) 147 and Central Reservation System (CRS) 148. System 10 may also include merchant financial services providers, represented by bank 142, for processing credit card and other financial transactions. System 10 may also include social media service providers, industry expert service providers and guide and review service providers, represented by SOC 142. System 10 may also include, not shown, an inventory system, a sales/revenue management system, a loyalty system and/or a property/operations system interconnected via network 155.

Loyalty systems comprise methods, products (e.g. credit/debit cards) and technical systems internal and external to affiliates that are structured marketing efforts that reward, and thereby encourage, loyal buying behaviors. These behaviors are used to monetize via incentives to perpetuate an intended behavior through an affiliate program. Communication with a loyalty system may include records of each transaction held in an analytics system for trend performance and suggestion models. Information from a loyalty system may be used to enhance adaptive search into suggestions for repeat or perpetual business. Integration with loyalty system can enable enhanced search and suggestive purchase options via recommendations. This system of customer transaction input enables machine learning of repeat business to elicit an effect on the inventive system to create new artifacts for scored processing. In addition, incentivation of perpetual interaction is enabled with the search and purchase system to continually refine feature and/or accommodation item results for selection and purchase.

Server 100 includes data store 116, booking engine 120, affiliate profile administrator portal 122, payment gateway 132, GDS interface 134, PMS interface 136 and CRS interface 138. Customer device 160 is any network connectable computing device capable of transmitting customer search query data and receiving search results. Customers may enter queries using customer input 164, a key board, for example, and may view results on customer display 166. Customer device 160 may run one or more applications such as customer app 162 for interacting with server 100. In one embodiment, customer app 162 is a web browser. A customer device 160 may also have a geolocation component such as a GPS receiver and/or a proximity detection component 168, permitting customer device 160 to determine where it is and/or what it is in proximity to for search input. In one embodiment, proximity detection component 168 may utilize RFID technology. Affiliate device 180 is also a network connectable computing device and may include affiliate input 184, affiliate display 186, and affiliate app 182 for interacting through the network with server 100. In one embodiment, affiliate app 182 is a web browser. In an alternative embodiment, affiliate app 182 is a branded application for interacting with server 100. Affiliate device 180 may be one or more computers and may host an affiliate's general inventory and/or sales modules. Other methods of computing devices capable of transmitting search query data may also include: telepathic apparatuses, taste apparatuses, biometric integration, holographic integration and artificial intelligence functions any of which can be configured to serve as potential means of search input with facilitation of availability for ticketing, booking, reserving and/or purchasing of amenities and/or special services and/or food/beverage.

The modular components of server 100 ensure dynamic interconnected communication, allowing customers to identify amenities and/or special services and/or food/beverage of affiliates through search, and providing the option to purchase said items. Furthermore, this system allows affiliate users to connect their system of amenities and/or special services and/or food/beverage to the inventive system, but not limited to accessing its dashboard directly and uploading their amenities and/or special services and/or food/beverage.

The components of this system connect to each other through data transfer channels. These data transfer channels are interchangeable with other relevant data transfer channels. Portions of system 10 may be cloud based; however, cloud capabilities are not required. Cloud systems simply offer optionality of resources and data transfer channels.

Data store 116 comprises one or more databases for storing customer user and affiliate user artifacts. Booking engine 120 facilitates customer search and results.

In one embodiment, data store 116 comprises a relational database and a non-relational database. The relational database may handle customer user artifacts; the non-relational databases may handle customizable affiliate user artifacts. The use of a non-relational database component allows the system to evolve by adapting to increasing differentiation in terms of artifact types and uses recognized and stored for recall in the systems.

The databases of the present invention are useful for additional purposes. In order to continuously improve searching, queries and query trends are tracked as part of session data and the data are used for purposes such as, but not limited to, affiliate feature matching and potential monetization.

In general, users provide search content through either text, commands interpretable as text, image(s) input, audio, electronic signals or by menu selection. The menus may be in the form of click boxes or selectable icons among other known options. Once the user provides the requisite strings and/or selections, those items are delivered to one or more of the databases so as to return matching content. Further, the user may select non-matching content, such as not wanting an Affiliate that allows pets. The processor(s) of the present invention are programmed to filter out such non-matching content from the items returned to the user. Similarly, the user can refine their selection by choosing more strings and/or selections in a second search, including non-matching items and replacing previous queries. Like the first search, the user can select items to be filtered out.

In one embodiment, the relational database is Postgres and includes the following tables:

| Table | Description |
|---|---|
| accounts_reservationmanager | Guests information (Used by executive assistants) |
| accounts_userprofile | Extra User's information (Billing address and hobbies) |
| auth_permission | User's permissions |
| auth_group | User's groups |
| auth_user | User's accounts |
| payment_braintreepayment | Payment (e.g. Braintree) transactions history |
| web_promotion | Promotions information |
| web_reservation | Reservations history |

In one embodiment, the non-relational database is MongoDB and includes hotel and features documents with the following structure:

```
Document
Hotel
Fields:
    hotel_id
    name
    address
    address_line2
    city
    state
    postal
    country
    hotel_phone
    ...
    latitude
    longitude
    ....
    hotel_description
    hotel_policies
Sub Documents:
    amenities -> Amenities Document
    services -> Services Document
    food and beverage -> Food and Beverage Document
    rooms -> Rooms Documents
    contacts -> Contacts Document
    images -> Images Document
Document
Amenities Document
Fields:
name (Amenity name)
default
Services Document
Fields:
name (Service name)
default
Food and Beverage Document
Fields:
name (Food and Beverage name)
default
```

Figure 3:
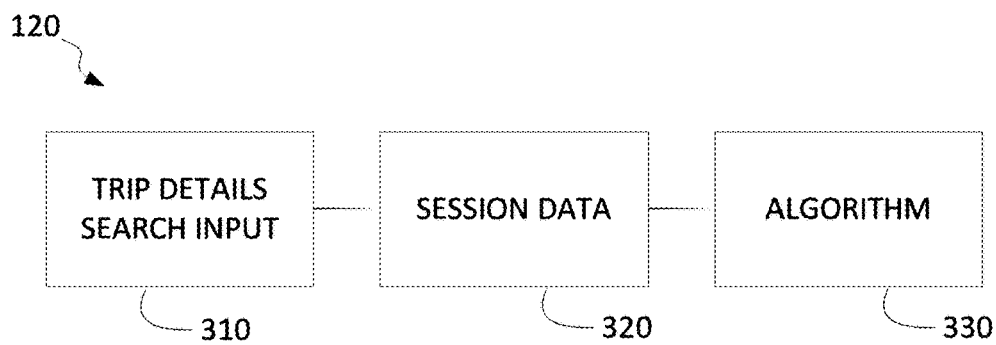
FIG. 3 illustrates aspects of an exemplary booking engine in accordance with some embodiments of the invention.

Referring to FIG. 3, booking engine 120 may be broken down into three components: search input form 310, session data 320 and algorithmic logic 330. Search input form 310 allows the customer to query existing artifacts from the database and through "typeahead" recalls anticipated items, hosted as artifacts, to be rendered for the user to select in an autocomplete list. If search input form 310 does not provide an artifact for the user to select, an administrative log is created and the search query is evaluated and updated within the database for expanded utilization of new amenities and/or special services going forward.

Session data 320 stores and applies the customer user interactions with the system to provide a learned user experience based on user preferences in navigating the user interface. For example, the user is not required to reset their times/dates when searching for various amenities and/or special services and/or food/beverage. The system will save these preferences unless the user resets the session data. Adaptive search capabilities permit recognition and scoring of customer inputs and types>scoring>human operator input via approval process>matching of amenities/services/food/beverage to affiliates with capabilities. Customer users interaction with adaptive search enables the inventive system, through machine learning of unmatched search input queries, to create a technical effect on the database system wherein unmatched and trend scored artifacts are clarified with the customer user and later create new feature categories for search, availability and purchase with matched and/or affiliates who have indicated evolving features.

Algorithmic logic 330 refers to algorithms and programming allowing the system to interpret data and communicate between components of the system in order to facilitate the intended user results.

Pseudo code corresponding to algorithms for search with facilitation of booking, reserving purchasing of amenities and/or special services includes:

```
TripDetails.CheckInDate = READ MachineHumanInterface
TripDetails.CheckOutDate = READ MachineHumanInterface
TripDetails.Item = READ MachineHumanInterface # Item Stands for Amenity/Special Service/Food/Beverage and Room
TripDetails.City = READ MachineHumanInterface
Availability = ItemAvailabilitySearch(TripDetails)
IF Availability == TRUE THEN
    PRINT "AVAILABLE"
    Result = PRINT "Proceed to check out?"
    IF Result == TRUE THEN
        BillingInformation = READ MachineHumanInterface
        Reservation = CREATE NEW RESERVATION IN Database
    ELSE
        PRINT "NOT AVAILABLE"
END IF
END
```

Pseudo code corresponding to semantic-style smart search input with typeahead recall capabilities includes:

```
UserInput = READ MachineHumanInterface
Result = SmartSearchAmenity(UserInput)
IF Result.WaitingForApprovalTag == TRUE THEN
        PRINT "No Results"
ELSE
        PRINT Result
END
# Keywords processed to query the database
# Algorithm number 3 looks for synonyms, mistypes in users input and subject related keywords
raw_keywords = GetKeywords(UserInput)
keywords = smartSearch(keywords) # Algorithm number 3
locations = GET Locations FROM Database
features = GET Features FROM Database
```

```
affiliates = GET Affiliate FROM Database
ObjectList = EMPTY # Contains resulting object list
# Check if the user specified a location such as a city, neighborhood, gps or
proximity detection
FOR keyword in keywords
    IF location THEN
            location = GET City WHERE Location = keyword
        END IF
END FOR
IF location = EMPTY THEN
            location = GetDeviceGeoLocation(Input)
            IF location = EMPTY THEN
            location = EVERYWHERE # look for the entire country when location is
not specified
            END IF
END IF
FOR keyword in keywords
    # Start keyword search on Affiliates
    FOR affiliate IN affiliates
        IF affiliate HAS keyword AND affiliate.city == location THEN
            APPEND affiliate TO ObjectList   # ObjectList contains the
results
        END IF
    END FOR
    # Start keywords search on Features
    FOR feature IN features
        IF feature HAS keyword AND feature.city == location THEN
            APPEND feature TO ObjectList   # ObjectList contains the results
        END IF
    END FOR
END FOR
PRINT ObjectList
```

In one embodiment, there is provided a machine learning feature wherein, if a search input is not recognized by the system, a record is created for evaluation of input value. In another embodiment, a user enters a data string and if the data string is not recognizable, the system of the present invention may perform a variety of searches to return like-sounding or like-appearing suggestions to the user for selection. Once selected, that selection and the original search string are stored together relationally in memory so that later users can be offered a similar suggestion.

Upon verification of the input value, the new adaptive search input is enabled with capable affiliates for updated search with facilitation of availability for ticketing, booking, reserving and/or purchasing of amenities and/or special services and/or food/beverage. Pseudo code illustrating this includes:

```
UserInput = READ MachineHumanInterface
Feature = QUERY UserInput FROM Categories IN Database
IF Feature <> EMPTY THEN
        Hotels = QUERY Feature IN Hotels WHERE Feature = Feature
        ORDER Hotels USING FeatureScore
        PRINT Hotels
ELSE
        PRINT "No Results"
        WRITE UserInput TO Database
        WRITE WaitingForApprovalTag TO UserInput IN Database
        QUERY Synonyms FROM Database
        GET Categories FROM Synonyms IN Database
        Score = FuzzyLogicScore <- UserInput, Synonyms, Categories
        WRITE Score TO UserInput IN Database
END IF
END
```

Pseudo code corresponding to facilitation of operation in optional tandem with human operators includes:

```
Amenity = READ MachineHumanInterface
IF Feature.WaitingForApprovalTag == TRUE THEN
    UserApproval = READ MachineHumanInterface
    IF UserApproval == TRUE THEN
        WRITE ApprovedTag TO Feature IN Database
    ELSE:
        PRINT "1.- Discard Feature?"
        PRINT "2.- Modify Score?"
        PRINT "3.- Modify Category?"
        Option = READ MachineHumanInterface
        IF Option == 1 THEN
            DELETE Feature FROM Database
        ELSE IF Option == 2 THEN
            UserScore = READ MachineHumanInterface
            WRITE UserScore TO Feature IN Database
        ELSE
            UserCategory = READ MachineHumanInterface
            WRITE UserCategory TO Feature IN Database
        END IF
        IF OPTION <> 1 THEN
            WRITE ApprovedTag TO Feature IN Database
        END IF
    END IF
END IF
END
```

Customers interact through the system via the search function, adding to the system's search capabilities through adaptive search update. Affiliate users add to the system's search capabilities via APAP. Pseudo code corresponding to dual user input (customer user and affiliate user) includes:

```
UserInput = READ MachineHumanInterface
Feature = QUERY UserInput FROM Categories IN Database
IF Feature == EMPTY THEN
    WRITE Feature TO Database
    WRITE WaitingForApprovalTag TO Feature IN Database
    QUERY Synonyms FROM Database
```

```
        GET Categories FROM Synonyms IN Database
        Score = FuzzyLogicScore(Feature, Synonyms, Categories)
        WRITE Score TO Feature IN Database
    END IF
    IF Feature.WaitingForApprovalTag == TRUE THEN
        UserApproval = READ MachineHumanInterface
        IF UserApproval == TRUE THEN
            WRITE ApprovedTag TO Feature IN Database
        ELSE:
            PRINT "1.- Discard Feature?"
            PRINT "2.- Modify Score?"
            PRINT "3.- Modify Category?"
            Option = READ MachineHumanInterface
            IF Option == 1 THEN
                DELETE Feature FROM Database
            ELSE IF Option == 2 THEN
                UserScore = READ MachineHumanInterface
                WRITE UserScore TO Feature IN Database
            ELSE
                UserCategory = READ MachineHumanInterface
                WRITE UserCategory TO Feature IN Database
            END IF
            IF OPTION <> 1 THEN
                WRITE ApprovedTag TO Feature IN Database
            END IF
        END IF
    END IF
END
```

Pseudo code corresponding to dynamic pricing update includes:

```
HotelICS = CREATE NEW CONNECTION TO HotelICS # Hotel's
Inventory Control System
REPEAT EVERY FixedPeriodOfTime
    ICSActiveReservations = READ HotelICS.Reservations
    ICSRoomsInformation = READ HotelICS.RoomsInformation
    LocalActiveReservations = READ Database
    LocalRoomsInformation = READ Database
    ActiveReservations = ICSActiveReservations JOIN
    LocalActiveReservations
    RoomsInformation = ICSRoomsInformation JOIN
    LocalRoomsInformation
END REPEAT
```

Pseudo code corresponding to availability search utilizing inventory control system includes:

```
Hotels = QUERY Hotels IN Database WHERE Hotel.City = City
AND Hotel.Feature CONTAINS Items
REPEAT
        Counter = Counter + 1
        Exit = FALSE
        Availability = FALSE
        Hotel = Hotels[Counter]
        Reservations = QUERY Reservations IN database WHERE
TripDetails.CheckinDate IS BETWEEN Reservation.CheckInDate AND
Reservation.CheckOutDate AND Reservation.Amenity =
TripDetails.Feature
        ItemsAvailable = Hotel.NumberOfItems - Reservations
        IF ItemsAvailable > 0 AND ItemsAvailable <=
        TripDetails.NumberOfItems
THEN
                Exit = TRUE
                Availability = TRUE
        ELSE IF COUNT(Hotels) > Counter THEN
                Exit = TRUE
        END IF
UNTIL Exit = TRUE
```

Pseudo code corresponding to availability search utilizing inventory control system includes:

```
UserInput = READ MachineHumanInterface
# LanguageAnalysis returns a list of languages and the probabilities
percentage values
Languages = LanguageAnalysis(UserInput)
Location = READ UsersLocation
LocationLanguage = QUERY Language WHERE Location =
UsersLocation
Language = LocationLanguage JOIN Location
Database = SELECT Database WHERE Database.Language = Language
END
```

Type ahead or text snippets from local expert reviews, blogs, and social media may augment search input and/or be connected to a referenced item via a search and purchase booking search link. Accordingly, customer users can copy and paste terms they find online or through the expert/social news updates feature of server 100 into search to recall travel tips or recommendations. Content supporting this feature can be obtained by SOC interface 139's crawling of SOC services 149 and storage of terms as artifacts in the database.

In one embodiment, type ahead and text snippets for augmenting search maybe sourced from expert reviews, which are uploaded and associated to an artifact. Accordingly, search results might include one or more reviews and associated artifacts. A customer viewing a review would be provided a search and purchase "Booking Button" within the review text that would bring the customer to the exact item (amenity, special service, food or beverage, or accommodation) for Booking.

Figure 4:
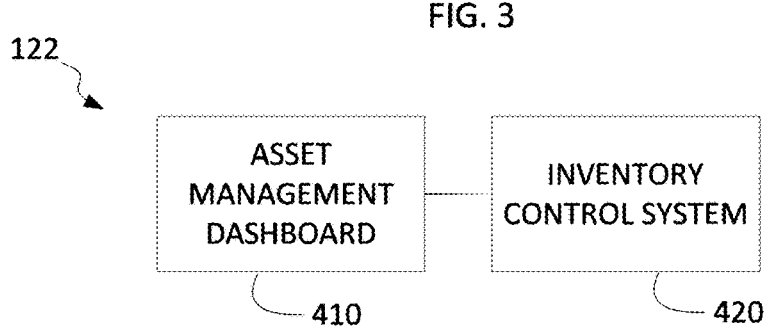
FIG. 4 illustrates aspects of an affiliate profile administrator portal ("APAP") in accordance with some embodiments of the invention.

Referring to FIG. 4, the affiliate profile administrator portal 122 (also known as "APAP") is broken down into two parts: asset management dashboard 410 and inventory control system 420.

Asset management dashboard 410 is both a front-end user-interface and a back-end artifact integration tool. Affiliates utilize this dashboard to upload and manage their artifact assets (referred to as Items when considering customer users) in order to render a searchable profile on the system. This dashboard 410 retains a hierarchy of administrator access between affiliates and our systems computerized systems coupled with human operator maintenance.

Affiliates may also have the opportunity to upload and manage contract documents such as terms and conditions associated with an accommodation and/or feature, which must be accepted by a customer upon booking that item. Such documents may be presented to or available to customers prior to purchase or check-out.

Inventory control system 420 is a system that works in tandem with asset management dashboard 410. Here, algorithms process items as artifacts, such as "features," in order to segment the items within the databases, thereby enabling artifacts to be available via search input. This feature is both manually driven and dynamically according to supply and demand by means of price control. More specifically, affiliates can log-on and upload/manage specific artifacts to the inventory control system via the APAP 122. In addition, affiliates can also enable real-time dynamic upload/managing of their artifacts between their own systems and the inventory control system. With a dynamic connection, the inventory control system is updated automatically whenever changes occur within the affiliate systems once artifacts are connected.

Figure 5:
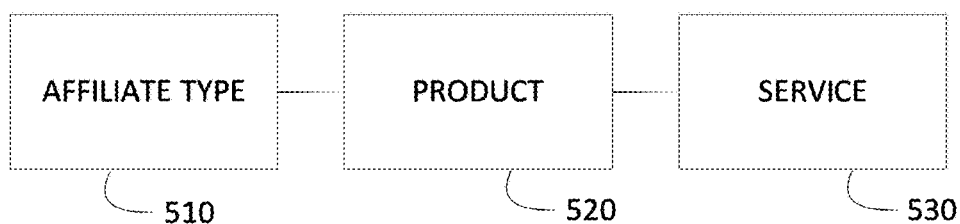
FIG. 5 is a schematic illustration of aspects of affiliate profiles in accordance with some embodiments of the invention.

Referring now to FIG. 5, affiliate profiles are broken down into three segments: type 510, products 520 and services 530. Type 510 refers to the category of affiliate such as hotel, motel, room accommodation, travel partner, entertainment partner, restaurant, club/lounge, dwelling or any other hospitality and food/beverage provider. Product 520 refers to any assets that an affiliate can provide for immediate purchase or for future purchase. Services 530 refer to any services that an affiliate can provide for immediate purchase or for future purchase. Profiles are created and maintained within the APAP Dashboard 410, which is tied to the affiliate's ability to provide for booking, reserving or purchasing of: food/beverages, amenities and/or special services via search. Profile components may include image or spatial renderings as enhanceable artifacts. Feature examples may include, but are not limited to venues, rooms or facilities where pricing is visually identifiable and/or selectable with search for availability and/or purchase.

Although not shown in the figures, the present invention collects voluminous data from users. All searches are captured and stored. Consequently, the system of the present invention has the ability to identify trends and changes in user desires quickly. Such changes can, for example, identify when user demand increases or decreases either quickly or outside of a normal range. When these atypical conditions are recognized, and if they are coupled with other information, such as general location (like a portion of a city), the system of the present invention can suggest pricing changes to Affiliates such as hotels, restaurants, clubs/lounges/bars and other travel accommodation venues. For example, as demand increases in a particular locale, an Affiliate can adjust rates for unrented features upwards. And if demand drops off for a particular day or time, pricing can be reduced. Affiliates can use these price changes to, for example, inform a client base via digital notification.

Figure 6:
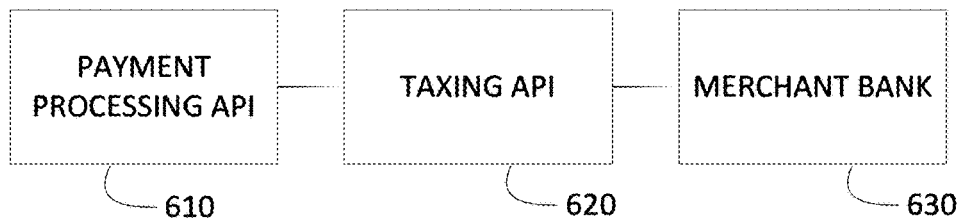
FIG. 6 is a schematic illustration of aspects of a payment gateway in accordance with some embodiments of the invention.

Referring now to FIG. 6, In order to comply with payment card industry ("PCI") Compliance, the payment gateway is broken down into three 3rd parties: payment processing API 610, taxing API 620 and merchant bank 630. While the customer user creates profiles on the system in the form of user profiles, not all information required for credit card processing is stored according to PCI. Therefore, the system may rely on the said 3rd parties to receive customer user information along with their feature order from the booking engine, in order to facilitate a purchase by way of a financial transaction between the customer user and the affiliate user. Payment is received by both the system provider and the affiliate for product and/or services purchased, along with confirmation to all parties (customer user, affiliate user and system provider).

Figures 7, 26:
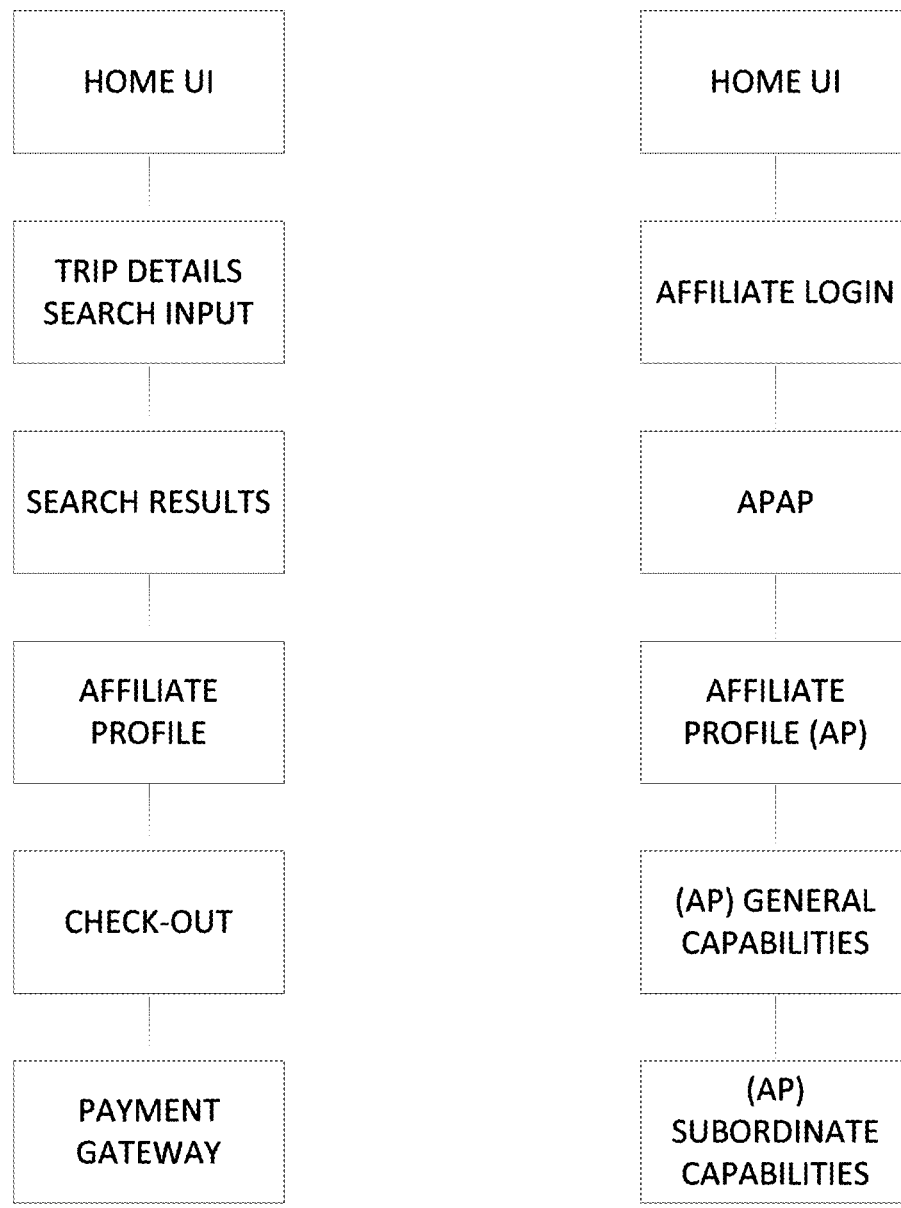
FIGS. 7, 8, 9 and 31 are schematic illustrations of exemplary customer user/system user interface flows in accordance with some embodiments of the invention.
FIG. 26 is a schematic illustration of an exemplary affiliate user/system user interface flow in accordance with some embodiments of the invention.
Figure 8:
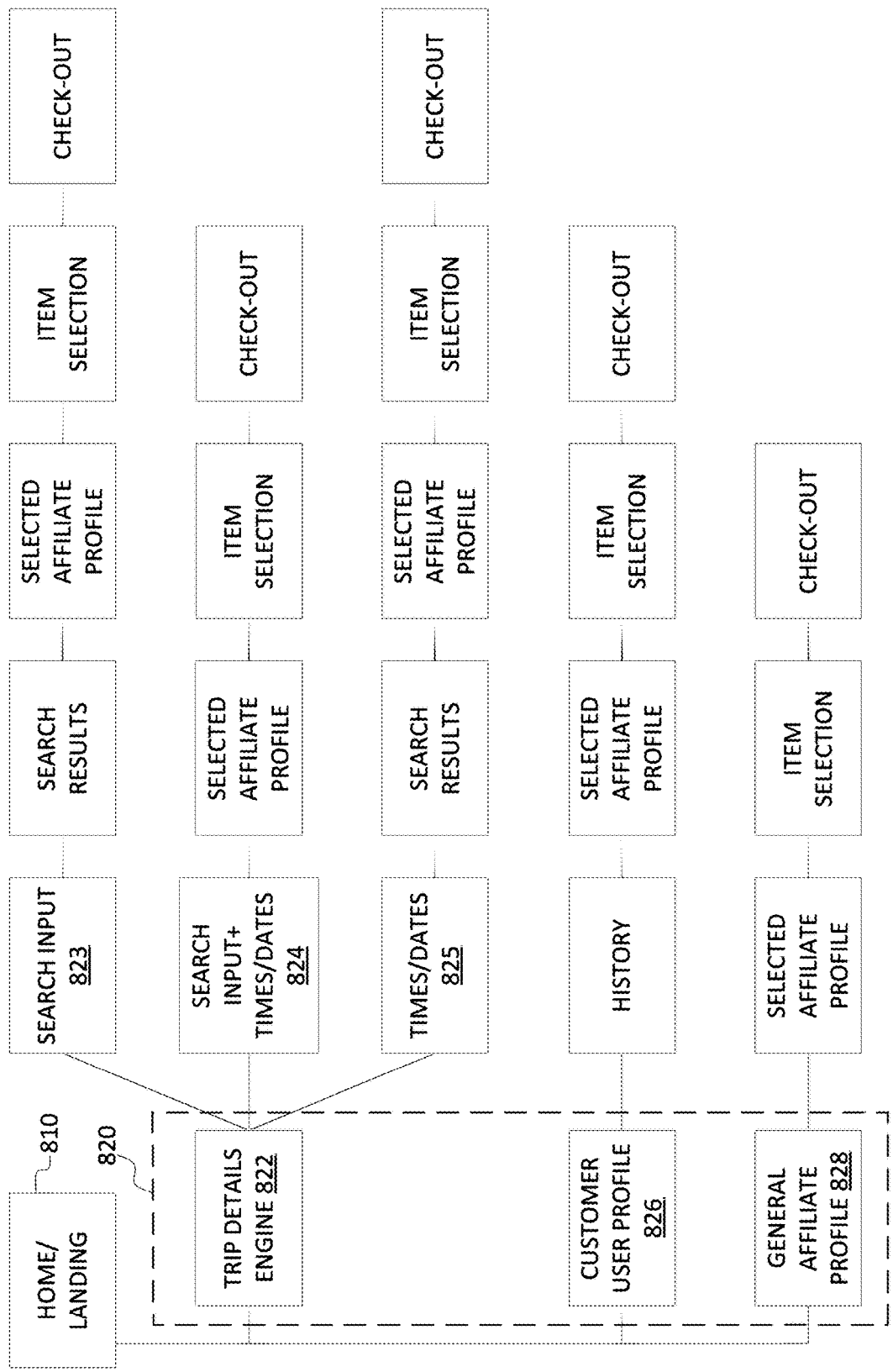

FIG. 7 illustrates an exemplary flow of a customer interaction with the system. Starting at the home user interface, the customer may enter trip detail, receive search results, selected an affiliate profile for purchase, check-out and pay via the payment gateway. Variants to this flow may be understood with reference to FIG. 8. Generally, a customer with begin at home/landing interface 810. Here, the customer user is enabled to perform an item search query or time/date query by selecting one of the landing choices 820. The system, via the trip details engine, utilizes fuzzy logic and algorithms to interpret the data input. The system thereby scores the data in order to process for verified trend analysis with the database components to assess availability via the inventory control system.

Alternatively, a customer may access their customer user profile 826. Upon logging in, customers have the ability to recall previously interpreted data through a profile management interface. This information recall is pulled from the customer profile database.

Alternatively, a customer may access a general affiliate profiles via selection 828. The customer user has the ability to select from a variety of general affiliate profiles rendered for inquiry. The information populated on the Home/Landing Interface is managed and rendered by APAP, which enables the system to render continuous deployment of data to the interface.

From the landing page 810, a customer may use trip details engine 822 to search via: name; destination; amenity; special service or food/beverage using search input 823. In some embodiments, the "destination" input is provided by the customer device's location system 168 and may comprise the device's geolocation or detection of a proximity beacon. The data input is sourced and thereby interpreted by trip details engine 822.

A customer may also provide a date as well as a search input through selection 824. This combines ability of item search and event availability to narrow the search results provided or selected a specific item for selection. This combines inventory control search elements within the trip details engine 822.

Via times/dates selection 825, a customer user may search via item availability.

History is a subcomponent of the customer user profile 826, where the customer is able to select previous actions within the system. Session data and analytics enable the system to recall and render a historical interface to process availability of previous input(s).

Upon accessing the home/landing interface 810 or via search results rendered from trip details engine 822, a customer user has the ability to select from a variety of affiliate profiles rendered for inquiry. The selected affiliate profile is rendered by the home/landing interface or the results of input(s) produced by the trip details engine 822.

With respect to search results, affiliate profiles are rendered where item is available based on search input from trip details engine 822.

Figure 9:
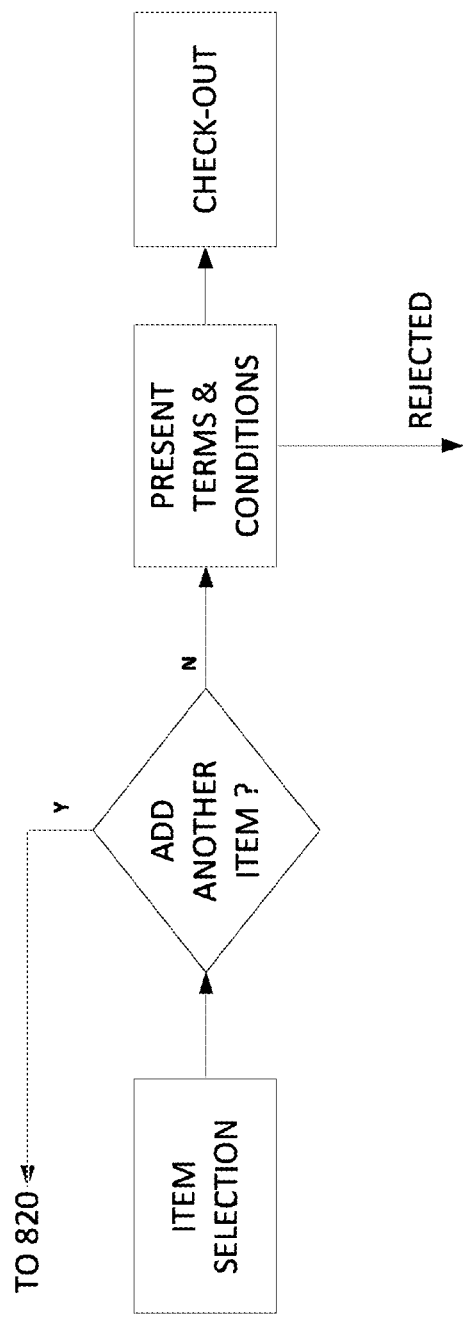

Item selection involves an interface allowing a customer user to select an intended item from search. A selected item is thereby identified to the system for the facilitation of availability for ticketing, booking, reserving and/or purchasing of features via the inventory control system for processing the transaction within the payment gateway. In the flow of one embodiment, as illustrated in FIG. 9, the user may have the option after selecting an item to select additional items to be added for check-out. This may be effected via a "+accommodation" type button such as link 1036 illustrated in FIG. 12 and links 1056 illustrated in FIGS. 13 and 14. Such buttons or links may include "+amenities" type functions for adding items such as Food & Beverage, Seating Selection or Table, Meeting Space, Room Service, Equipment Rentals, Facilities or Events, etc. In addition, in some embodiments, affiliate terms and conditions may be presented to or made available to customers prior to check-out; if a customer does not accept the terms and conditions, the transaction cannot be consummated.

Item selection may further include an interface allowing environment configuration of the selected item. Capabilities of a selected item are uploaded and managed in the Inventory Control System via a series of input and management fields, such as seating arrangement, facilitation of equipment, lighting specifications, occupancy/capacity, catering, orientation, etc. Customers may select a configuration for a selected item or submit a request for an alternative configuration for approval (not shown).

Check-out includes an interface for customer user confirmation of intended item selection via an editable confirmation of intended purchase. Through stored session data within the systematic 'breadcrumb' navigation of item selection(s) throughout the process flow, the system interacts with the payment gateway to complete the intended transaction.

Figure 31:
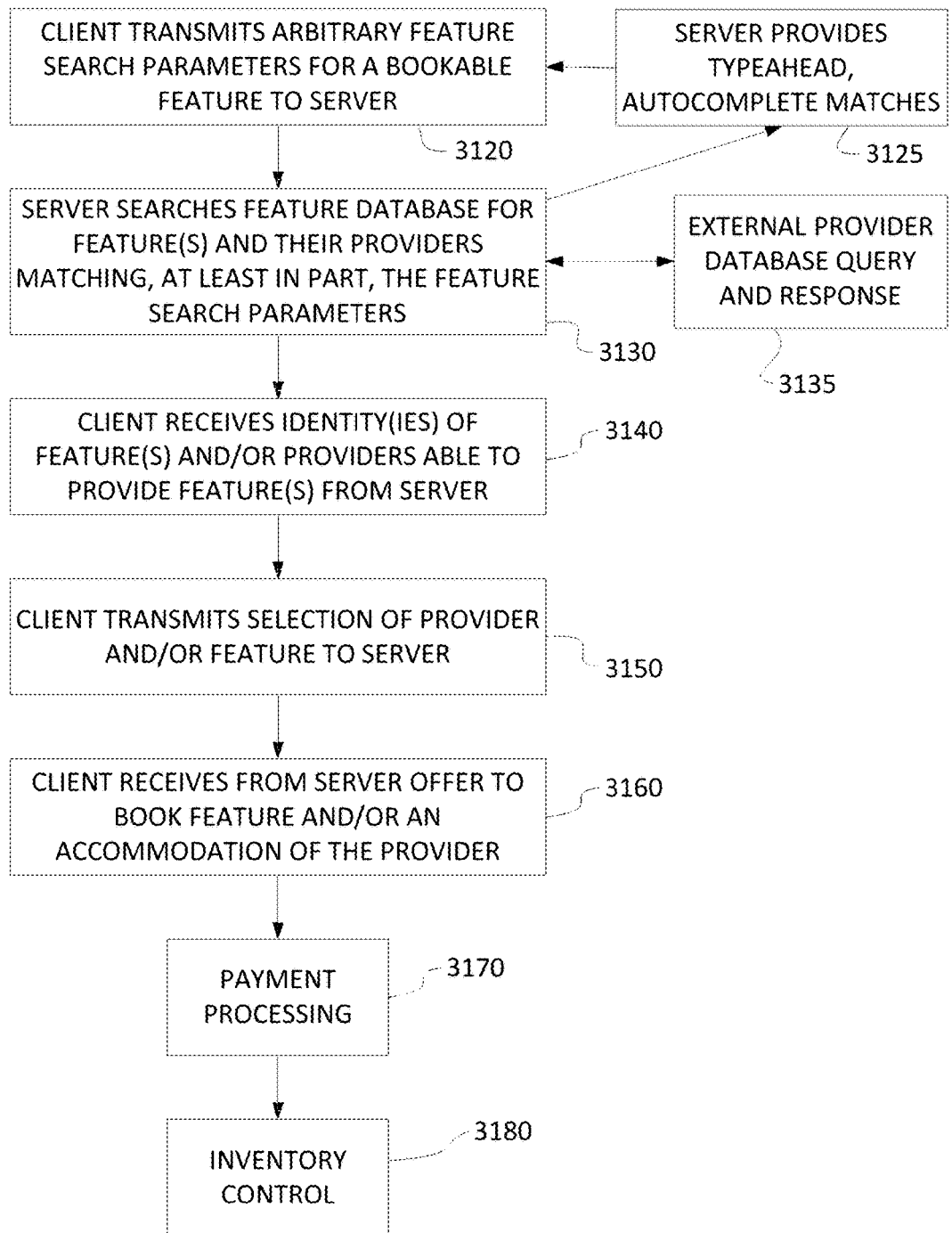

Methods in accordance with the invention may follow the flow illustrated in FIG. 31, including a step 3120 whereby a client transmits arbitrary feature search parameters for a bookable feature to a server, a step 3130 whereby the server searches a feature database for feature(s) and their providers matching, at least in part, the search parameters, a step 3140 whereby the client receives identity(ies) of feature(s) and/or providers able to provide the feature(s) from the server, a step 3150 whereby client transmits a selection of a provider to the server, a step 3160 whereby the client receives from the server offer to book the feature and/or an accommodation of the provider. Such methods may also include a step 3170 whereby payment information is (optionally) transmitted to the server and processed. Such methods may also include a step 3180 whereby inventory records for the booked feature(s) and/or accommodation(s) are updated. Such methods may also include a step 3135 whereby an external provider database is queried in order to determine matching feature(s)/provider(s) and/or determine availability. Such methods may also include a step 3125 whereby the server provides typeahead/autocomplete information to the client devices.

Figure 10:
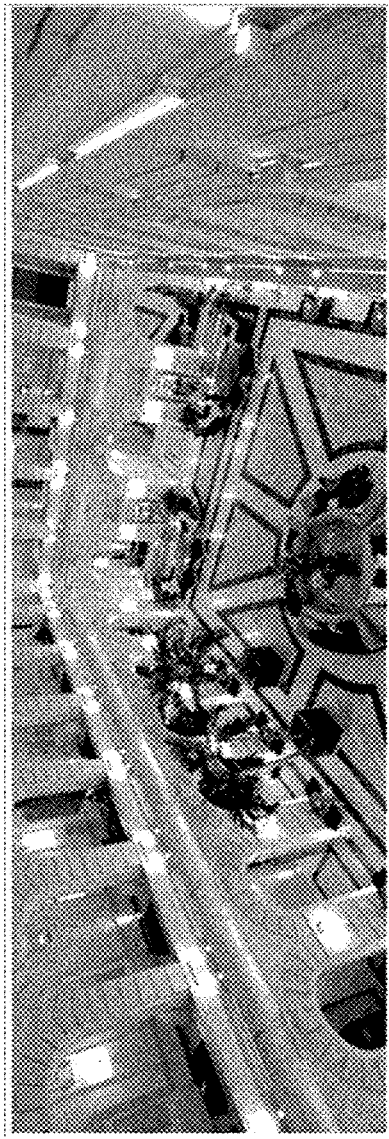
FIGS. 10, 12, 13, 14 and 15 are portions of exemplary screen shots of a customer user portal's home search input engine page in accordance with exemplary embodiments of the invention.
Figure 12:
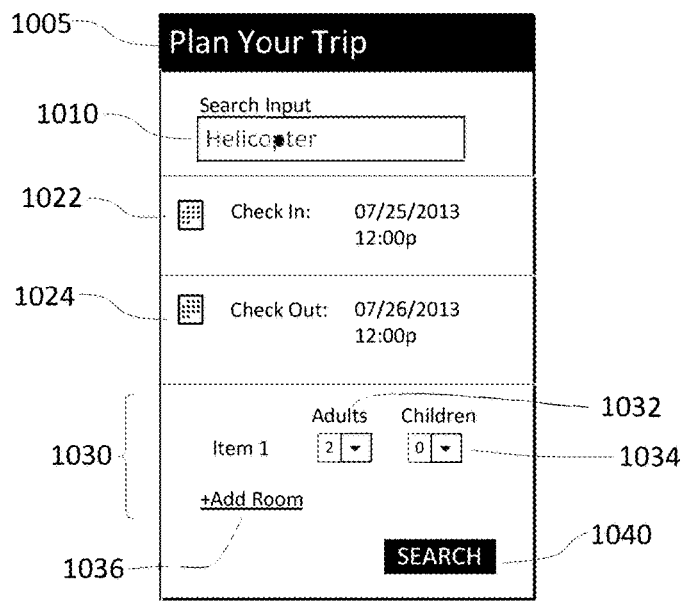

Referring now to FIGS. 10 and 12, there is provided a portion of an exemplary screen shot 1000 illustrating where a customer user can input his/her query to search available features. Screen 1000 includes query area 1005 which comprises a free form entry box 1010, a date picker 1020, an occupancy selector area 1030 and "search" button 1040. Date picker 1020 may include a time entry box and/or time picker (not shown). Screen 1000 may include affiliate general profiles area 1050. In addition to affiliate names or destinations, the features for affiliate general spaces or even room specific features will render in search results; allowing the user to select based on their preference. FIG. 12 exemplifies the customer user's ability to further specify the search input (trip details) engine by selecting a check-in time/date 1022, a check-out time/date 1024 for the intended search/purchase of a feature. In some embodiments, where a rate matrix provides for time/date selection (see, e.g., FIG. 20), specification of timing information via 1022 and 1024 is optional. Occupancy selector area 1030 may include a drop-down box for a number of adults 1032 and a number of children 1034. Additional rooms may be added to the query by selecting the Add Room link 1036.

Figure 11:
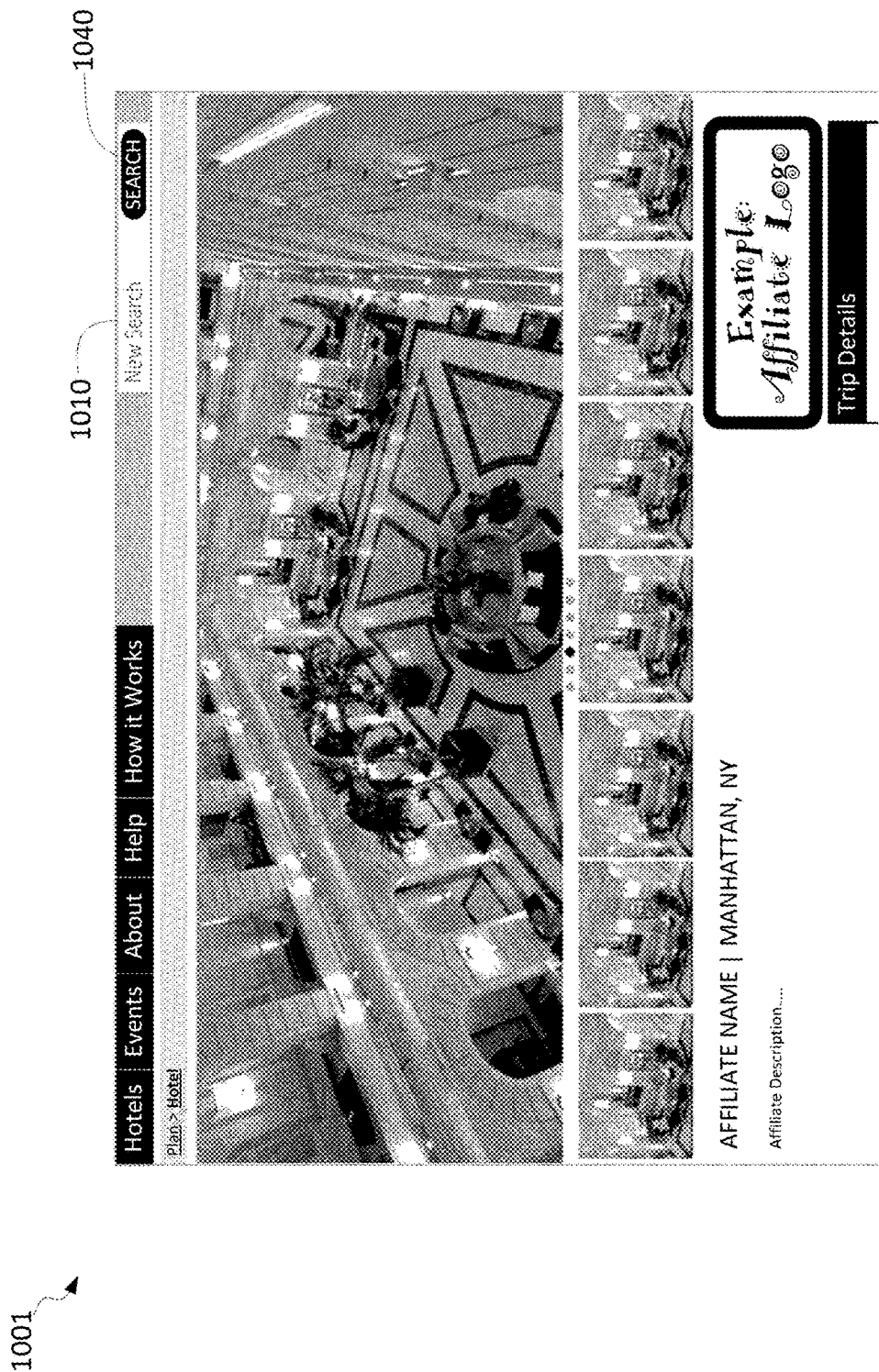
FIG. 11 is a portion of exemplary screen shot of a customer user portal's affiliate landing page in accordance with exemplary embodiments of the invention.

With reference to FIG. 11, in one embodiment, a customer user may initiate a search after "landing" on an affiliate landing page such as exemplary landing page 1001 and utilizing free form entry box 1010 and search button 1010. In addition, free form entry input 1010 is available throughout navigation of the interface, enabling a user to search free form or focused within an affiliate profile.

Figure 13:
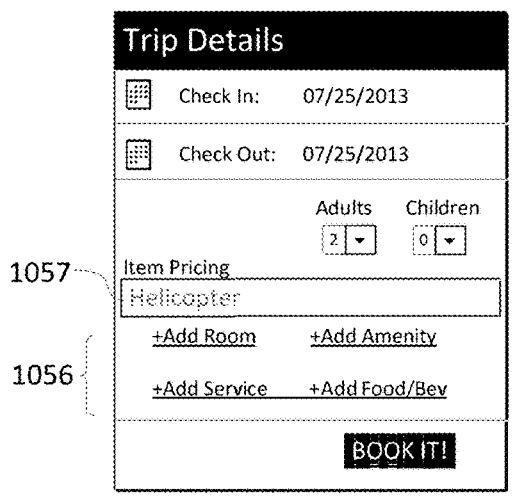
Figure 14:

With reference to FIGS. 13 and 14 according to one embodiment, an add-on component of Search enables coupled Search via a la carte selectable Item Categories housed in a shopping-cart like function. With reference to FIGS. 14 and 22, these add-on functions can also be implemented post initial transaction in that customers may recall their transaction through a historical interface and add Search items to their existing purchase such as illustrated in section 1070. The customer user may further specify the search input (trip details) engine by selecting a check-in time/date, a check-out time/date via date pickers 1075. In a preferred embodiment, items from more than one affiliate may be added to the shopping cart function for a single checkout transaction.

Figure 15:
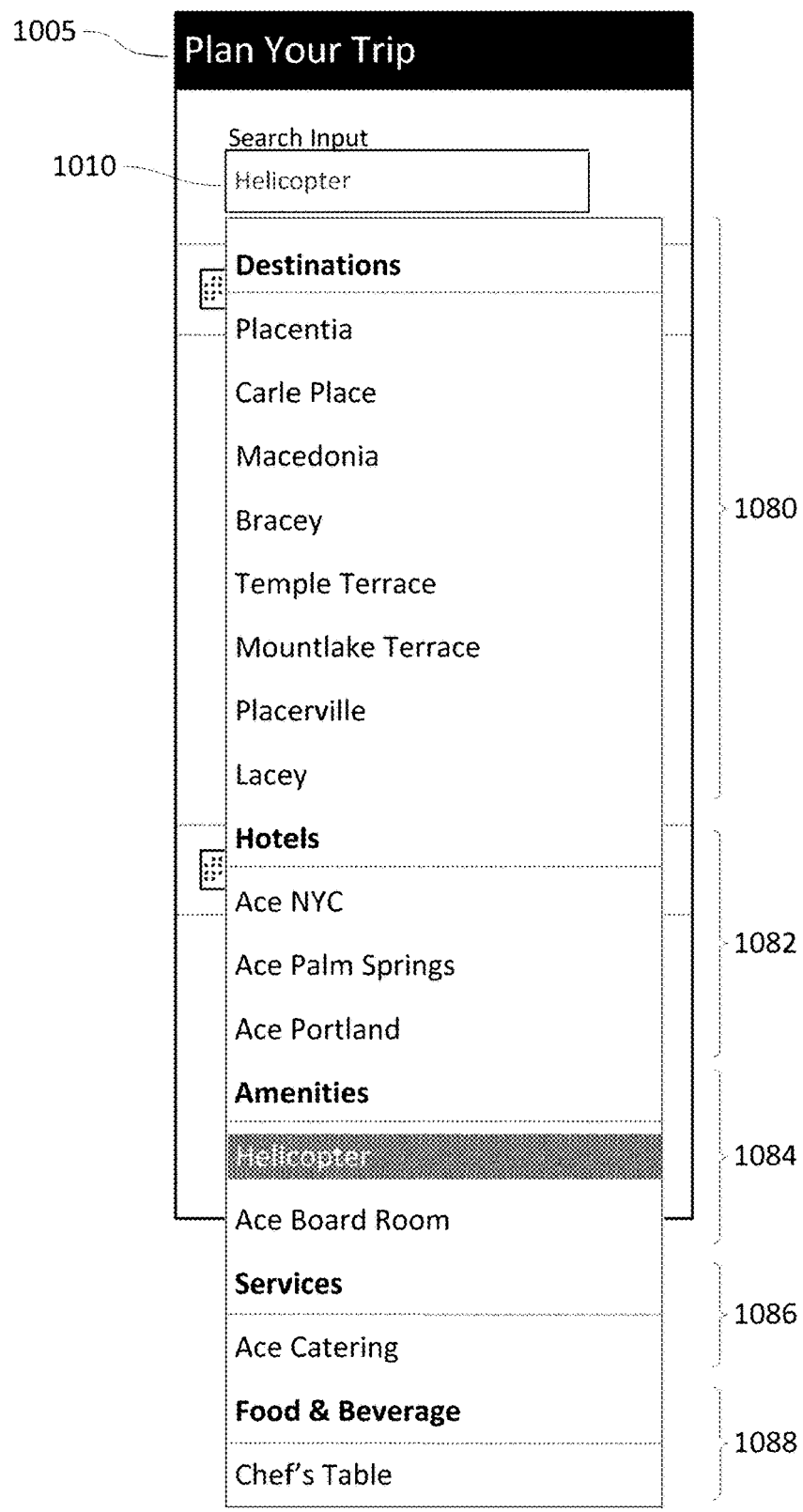

With reference to FIG. 15, according to one embodiment search by Category within Search Engine Input may be enabled. Users can not only Search specific 'items' by system recognized type-ahead, but also 'category segments' such as Destinations 1080, Affiliates (e.g., hotels) 1082, Amenities 1084, Services 1086 and Food & Beverage 1088.

Figure 16:
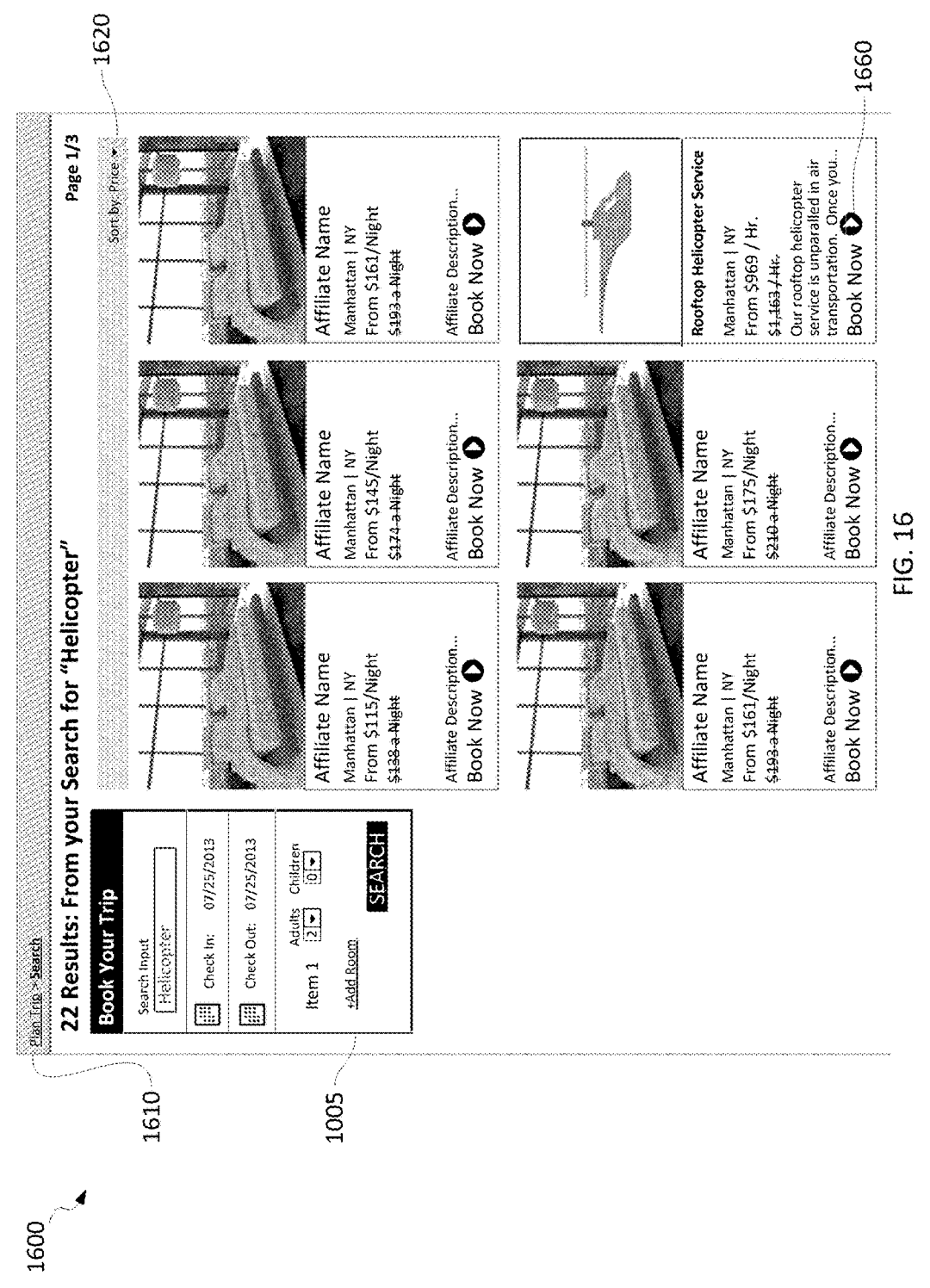
Figure 17:
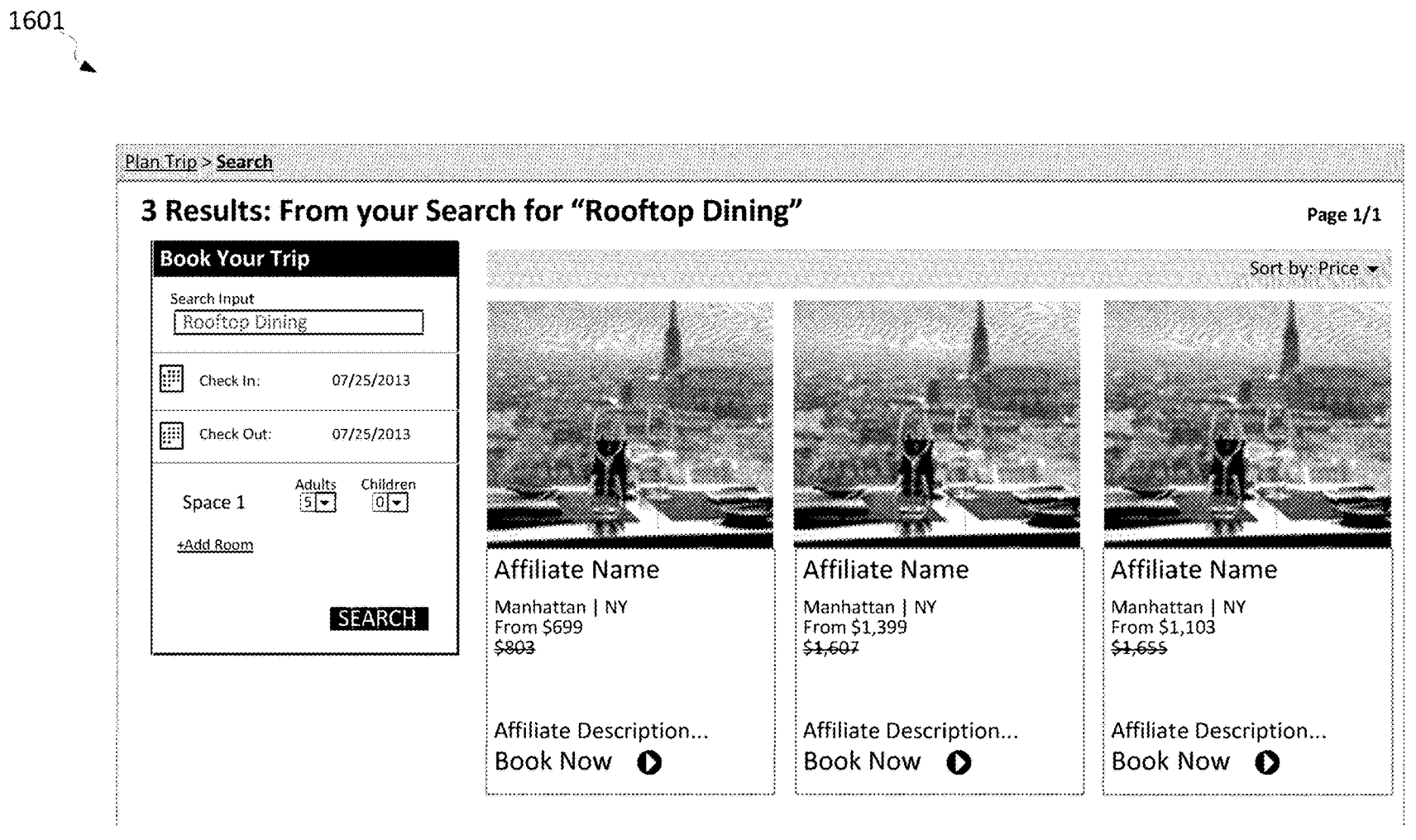
Figure 18:
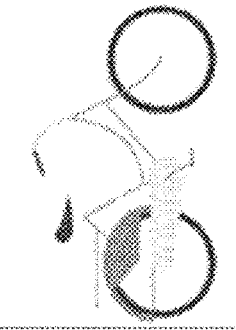

Referring now to FIGS. 16, 17 and 18, once a search query is entered in the search input (trip details) engine, the user's results 1650 will render in a search specific results display such as displays 1600, 1601 and 1602. Users can then sort based on a sort preference 1620 and select an affiliate based on their unique search criteria. Displays 1600, 1601 and 1602 may include a breadcrumb indicator 1610. If a user identifies an acceptable result in the list, the user may select a book now link 1660 to effectuate the booking and/or ticketing process.

FIGS. 19 and 20 illustrate time band pricing and the pop-up screens presented to a user where pricing is time band dependent. In FIG. 19, pop-up screen 1603 illustrates that certain amenity types have been configured for varying prices according to time of day as well as day of the week. In FIG. 20, pop-up screen 1604 illustrates that certain room types, if available, have been configured for varying prices according to day of the week. In some embodiments, pricing may be algorithmically based on availability; for instance, if twenty of an item are available, the price may be lower than if only one or two are available.

With reference to FIG. 22, according to one embodiment, an Extension component 1670 of Search can also be implemented post initial transaction to be recalled and queried for inventory availability of the selected item to extend the reservation for a designated increment of time. The customer user interface may include an extension time selector 1673, confirmation request selection 167 4 and extension request selection 1675. If special requests are made, including additional item transactions, human operators can optionally work in tandem with the technical systems via the "Concierge Instructions" input form 1671. This function can be performed at the company level or input from the affiliate interface. Lastly, add-on Search items to the existing purchase, as in Check-Out, can be aggregated through this Reservation Details 1672 historical interface for a single transaction assuming inventory availability prior to the selected date/time inputs. Subsequent search and purchases can otherwise be accounted for.

FIG. 23 illustrates a partial display screen 2300 of a selected exemplary affiliate profile page. The customer user has the ability to review available offerings in detail, including images and spatial renderings 2340, narrative 2330, amenities listings 2320 and desired amenity 2310. Interface 2305 synopsizes the search and booking criteria and provides a link to book the accommodation or ticket the event. Breadcrumb indicator 2350 permits a user to see progression of the booking process and return to previous steps and screens.

FIG. 24 illustrates a partial screen shot 2400 of a page by which the customer user may interact with a payment gateway to confirm feature selections. The page comprises billing information area 2420, guest information area 2430 and hotel concierge instructions area 2440. In one embodiment, communications input in this field cause a communication, e.g., an e-mail, to be sent to the concierge in conjunction with the check-out confirmation, notifying the affiliate of the customer's request. Once the user is certain of their desire to book the feature shown at point 2410, the customer user can "book" their selection and they will receive a confirmation. Meanwhile, both the affiliate and the system provider will receive payment for product/services purchased via a third party processing partner. FIG. 25 illustrates a partial screen shot of an exemplary a la carte shopping cart check-out showing accommodation and amenity policies and cancellation terms 2418 (providable by affiliates using the APAP interface) and a summary of the check-out transaction 2416. A terms of service check box 2412 and "book" button 2414 are included. Users are enabled to edit and delete items in the cart and one or more items from one or more affiliates can be accumulated in the cart. Additional items may be added by executing a new search in a persistent search query box 1010 as may be provided throughout the interface as described above with reference to FIG. 11.

In an exemplary user experience flow, a user may interact with user interface 1000 as shown in FIG. 10, by typing, e.g., "helicopter" into box 1010. The interface may render a categorized type-ahead drop-down box as illustrated in FIG. 15 from which the user may select "helicopter" from exemplary category section 1084. The user would then be presented with Trip Details interface as illustrated in FIG. 13 wherein the user would be enabled to specify dates and times. Upon selecting the item pricing link 1057, the user would be presented with a rate matrix 1603 such as that illustrated in FIG. 19. Upon selecting the desired item from rate matrix 1603, the user would then be presented with an item accounting Trip Details interface as illustrated in FIG. 14, wherein the user would see the selected helicopter item in section 1070 and be enabled to specify additional requests using section 1056. For example, if the user selected "+Add Room," the user would then be presented with a room rate selection matrix such as 1607 illustrated in FIG. 21. Upon selecting a room accommodation, returning to the Trip Details interface and then selecting "Book It!", the user would then be presented with an a la carte shopping cart check-out summary 2405 as illustrated in FIG. 25, whereupon the user can review the transaction details, complete the booking or make changes.

FIG. 26 illustrates an exemplary affiliate user interaction with the system. The affiliate user generally starts interaction with system at the Home UI; however, once a profile is created the steps can be circumnavigated. The affiliate may login to access an existing Affiliate Profile or create an affiliate login.

Based on the affiliate user input, the system stores the user assets as artifacts in within the inventory control system. The affiliate profile administrator profile ("APAP") is the dashboard interface that enables both affiliate users and human operators to work in tandem to maintain affiliate profiles. The interface is maintained within the inventory control system. As affiliate assets are uploaded into the system, the data is interpreted into artifacts used to recall affiliate capabilities for product/services offerings. This system is both static and/or dynamic with affiliate systems; including the ability to work in tandem with human operators. Human operators serve a supportive function as needed.

The affiliate profile comprises dedicated representations of affiliate information data within an interface that enables users to examine and select offerings of products/services available for purchase. These are rendered via search to the customer user. The affiliate profile is produced by the system through data transfer channels exchanging affiliate assets statically and/or dynamically to APAP.

Affiliate profile general capabilities refers to affiliates common space offerings. Maintained within APAP, the system delineates capabilities between common and subordinate spaces. Subordinate capabilities refers to affiliates private space offerings.

Figure 27:
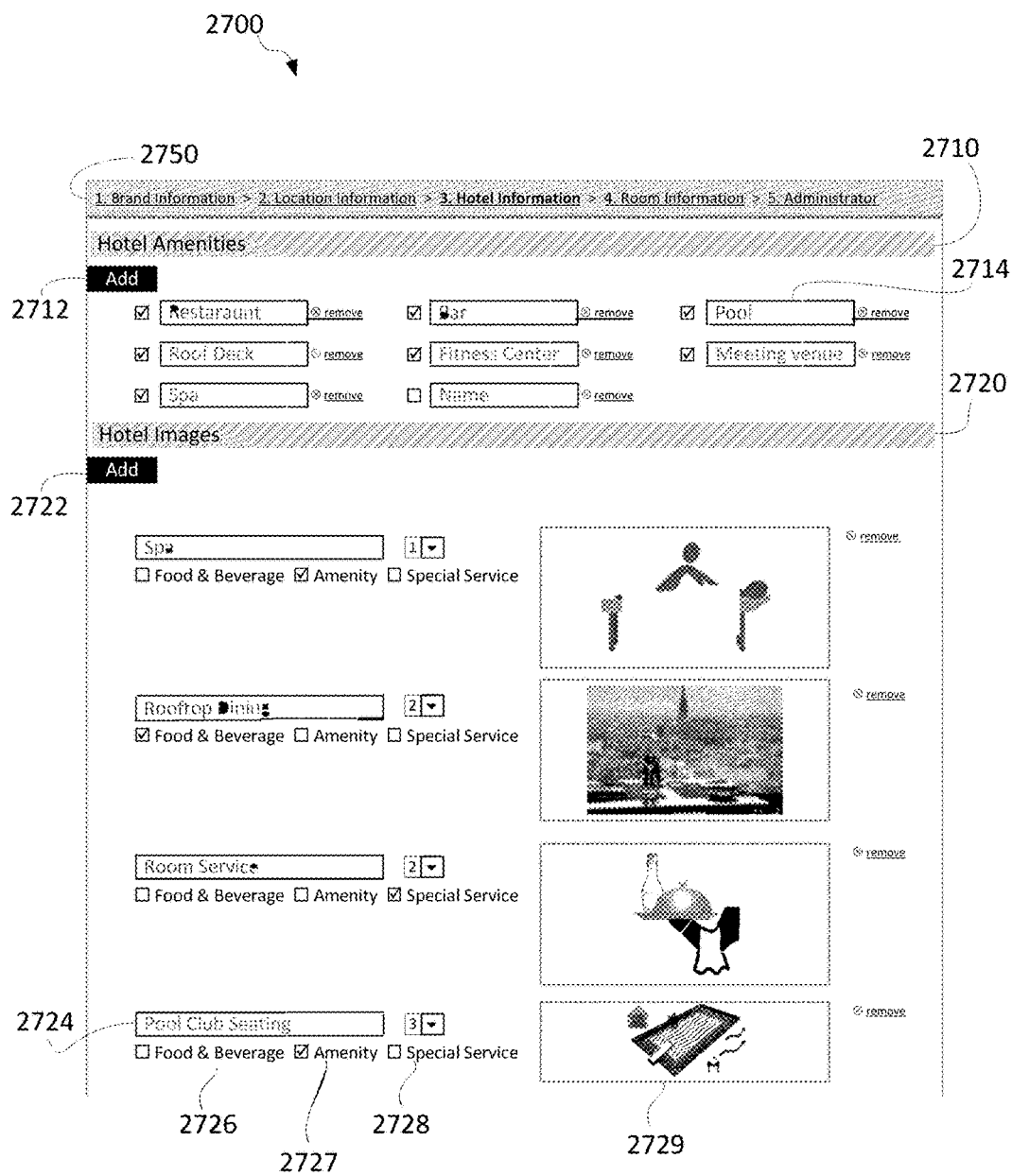
FIG. 27 is an exemplary screen shot of an APAP's affiliate information page (for a hotel affiliate) in accordance with an exemplary embodiment of the invention.

FIG. 27 illustrates a partial screen shot 2700 of the hotel amenities section where the affiliate can select their standard amenities and/or special services in section 2710. Here the affiliate can also create new features by selecting add 2712 and typing the feature into a text box such as box 2714. Alternatively, the affiliate can eliminate a predetermined input for feature. Generally, items in this section are available to the entire space in scope; in this example, the affiliate is a hotel.

The hotel images section 2720 attributes images, e.g., photo 2729, to the bookable/reservable/purchasable food & beverage, amenities and/or special services through a sub-interface (not shown) that enables dynamically priced features coupled by availability. Affiliate users may click add 2722, enter a feature into box 2724 and select its category with check box selections 2726, 2727 and 2728. Both sections may provide searchable features to users. Breadcrumb indicator 2750 permits the user to see progression of the process and return to previous steps and screens.

Figure 28:
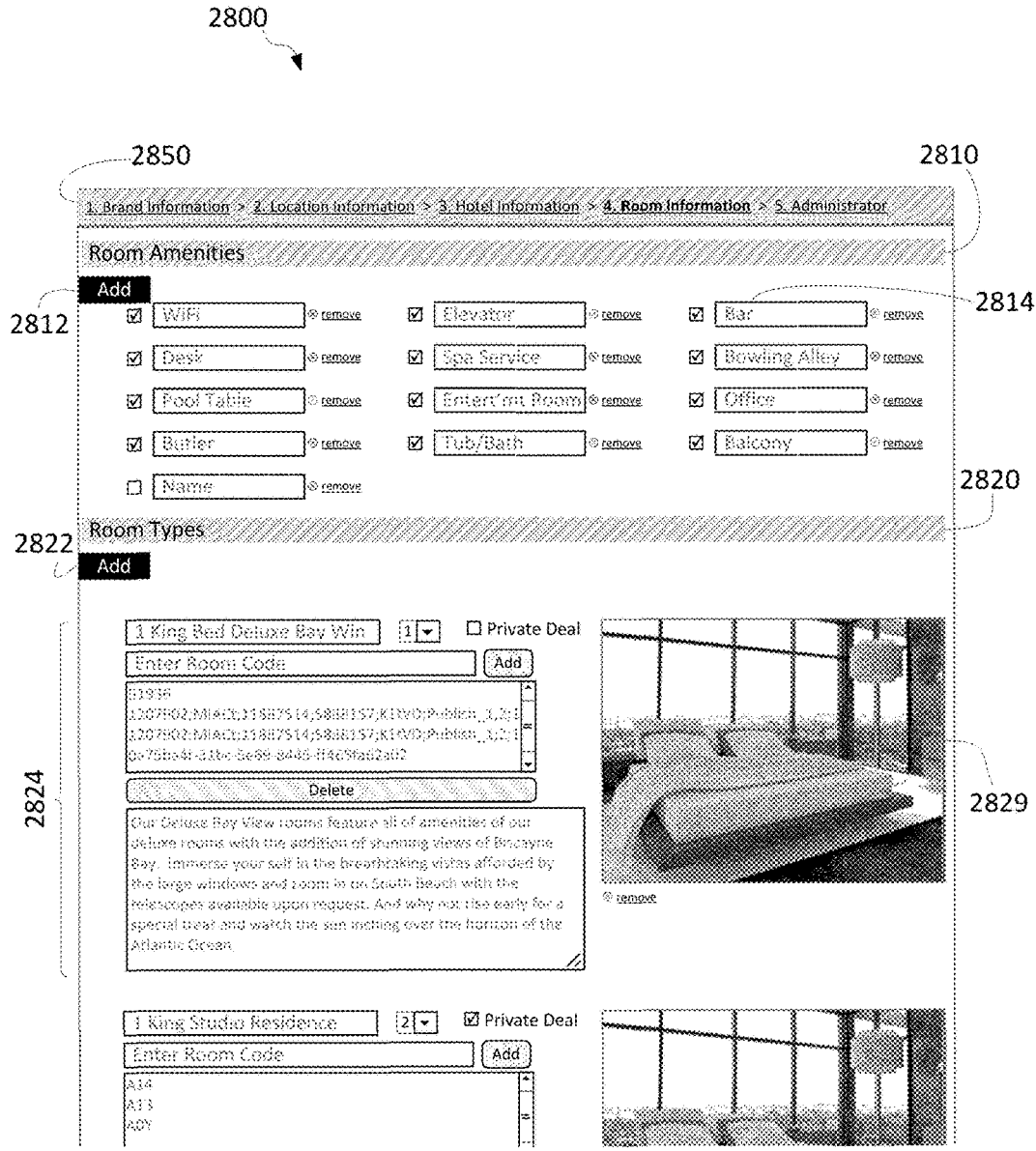
FIG. 28 is an exemplary screen shot of an APAP's rooms page (for a hotel affiliate) in accordance with an exemplary embodiment of the invention.

FIG. 28 illustrates a partial screen shot of an exemplary room's amenities screen 2800. If the affiliate user has an alternative component of their availability for product or service offerings, such as rooms, the APAP interface allows for more specific search and purchase of said feature capabilities. The room amenities section 2810 is where the affiliate can select their standard features separately from the affiliate itself. Here the affiliate can also create new features by selecting add 2812 and typing the feature into a box such as text box 2814. Alternatively, the affiliate can eliminate a pre-input amenity and/or special service by deselecting an associated check box. Generally, items in this section are available to the entire space; in this example, the affiliate is a room within a hotel.

The room types section 2820 attributes images to the bookable/reservable/purchasable food & beverage, amenities and/or special services through a sub-interface (not shown) that enables dynamically priced features coupled by availability. Room photos such as photo 2829 may be added and room details may be added, deleted or updated using controls area 2824. Both sections provide searchable features to users. Breadcrumb indicator 2850 permits the user to see progression of the process and return to previous steps and screens.

In another embodiment, a module interface can be placed or embedded within an affiliate and/or vendor site and/or displayable on a customer device providing for search, availability and purchase of features such as amenities and/or special services and/or food/beverage. The module interface may also handle a booking query for a desired room configuration through the network gateway, with said external provider.

Embodiments of the present invention may interface with affiliates' general inventory and/or sales/revenue modules by enabling import of data to the APAP. For example, comma separated value (CSV) format files from small hotels or travel affiliates may categorize their inventory in simple tables (e.g., room types in rows and days of the week in columns—allowing pricing to be different according to supply and demand). Affiliates can maintain these tables feature with a spreadsheet program, export the data and then utilize the system's upload>export feature to populate APAP's input forms with the rows (e.g., rooms, items, amenities, services, food and beverages; tables) and columns (e.g., days of the week). Pricing may change across the week via ADR (Average Daily Rate) for any category (e.g., rooms, items, amenities, services, food and beverage) as well as within finer granularities such as time bands during a particular 24-hour period. See FIGS. 19 and 20 for examples of varying granularities for time-based pricing. Pricing may be further managed by adjusting for promotional periods, either by the affiliate or system operators.

Figure 29:
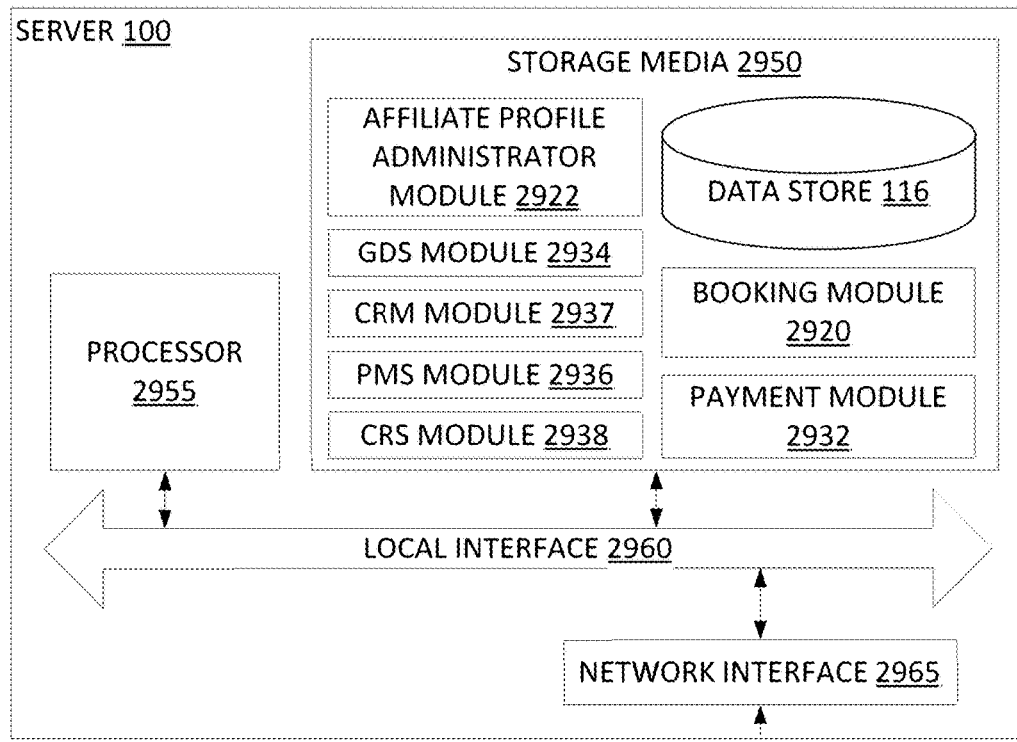
FIGS. 29 and 30 are schematic representations of an exemplary server device and client device, respectively, according to embodiments of the present invention.
Figure 30:
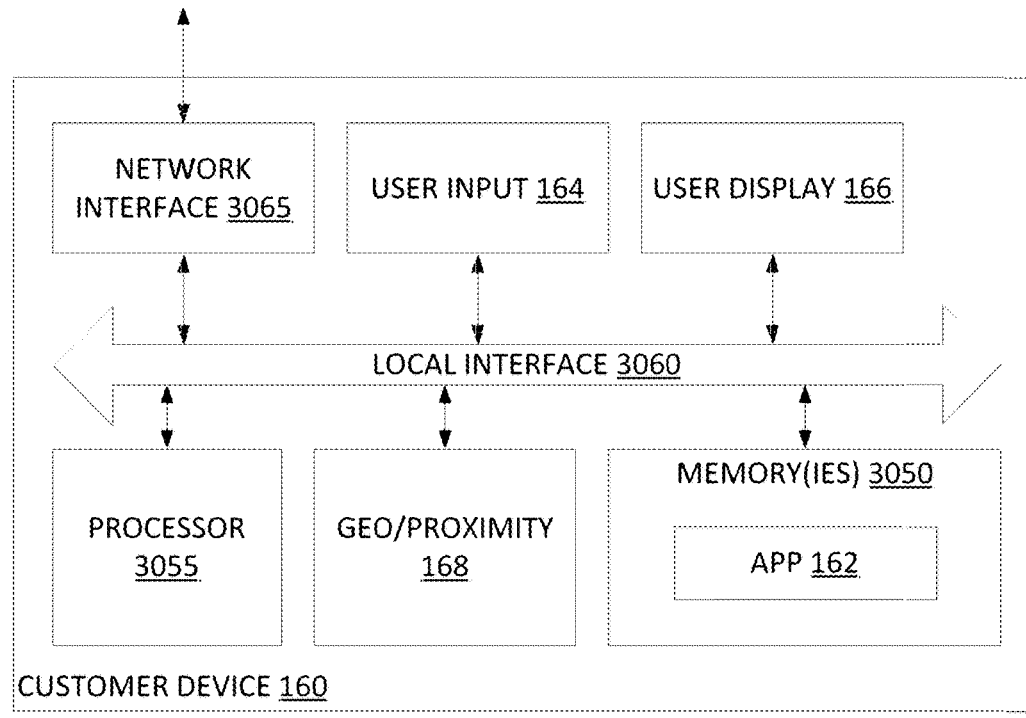

Referring next to FIGS. 29 and 30, shown are schematic block diagrams of an exemplary server 100 and exemplary customer device 160, respectively, according to an embodiment of the present disclosure. The server 100 and customer device 160 include respective processors 2955, 3055 and memory(ies)/storage media 2950, 3050, both of which are coupled to local interfaces 2960, 3060. The local interface 2960, 3060 may comprise, for example, a data bus with an accompanying address/control bus or other bus structure as can be appreciated. The customer device 160 includes a display 166 coupled to the local interface 3060 to allow the processor 3055 to apply visual data to the display 166, such as a user interface generated by the customer application 162. Display 166 may be a holographic display, super imposed display image or augmented reality display. In some embodiments, the server 100 and/or customer device 160 can include other elements that are coupled to their respective local interfaces 2960, 3060 such as a location system 168 configured to obtain location, proximity or position data and other systems as can be appreciated. In addition, the customer device 160 may include customer input 164 such as a touch-screen, keyboard, toggles, mouse and push buttons. Server 100 and customer device 160 further include a network interface 2965, 3065, coupled to local interface 2960, 3060. Network interface 2965, 3065 is adapted to allow server 100 and customer device 160 to communicate with each other and other network resources through, for example, network 155 (see FIG. 1) which may be the internet, an intranet or other network system. Network interface 2965, 3065 may employ a protocol such as TCP/IP and may communicate on a medium such as WiFi, wired Ethernet or other network media.

Stored in the respective memories 2950, 3050 are several components that are executable by the processors 2955, 3055. In particular, stored in the memory 2950 of the server 100 are booking module 2920, affiliate profile administrator module 2922, payment module 2932, GDS module 2934, PMS module 2936, CRM module 2937, CRS module 2938 and data store 116. Stored in the memory 3050 of the customer device 160 may be the customer application 162 and other data and applications. It is understood that there may be other applications that are stored in the memories 2950, 3050 and are executable by the respective processors 2955, 3055 as can be appreciated. Where any component discussed herein is implemented in the form of software, it may be in the respective machine code of processor 2955, 3055 or based upon a source programming language such as, for example, C, C++, Java, Java Script, Perl, PHP, Python, Flash, and/or other programming languages.

A number of software components are stored in the respective memories 2950, 3050 and are executable by the respective processors 2955, 3055. In this respect, the term "executable" means a program file that is in a form that can ultimately be run by the processors 2955, 3055. Examples of executable programs may be, for example, a compiled program that can be translated into machine code in a format that can be loaded into a random access portion of the memory 2950, 3050 and run by a respective processor 2955, 3055, source code that may be expressed in proper format such as object code that is capable of being loaded into a random access portion of the memory 2950, 3050 and executed by a processor 2955, 3055, or source code that may be interpreted by another executable program to generate instructions in a random access portion of the memory 2950, 3050 to be executed by a processor 2955, 3055, etc. An executable program may be stored in any portion or component of the memory 2950, 3050 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2950, 3050 is defined herein as both volatile and nonvolatile memory and data storage components. Volatile components are those that do not retain data values upon loss of power. Nonvolatile components are those that retain data upon a loss of power. Thus, the memory 2950, 3050 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device. Although described herein as a single memory and a single processor, it should be recognized that both distributed memory and distributed processing are encompassed in the present invention. Such distributed memory may be distributed in any of several known ways, such as but not limited to distributed by type of data or distributed across a plurality of data stores housed in different locations. Similarly, distributed processing includes any of several known ways including but not limited to processor arrays and a plurality of different processors located in different locations performing different types of functions.

In addition, the processor 2955, 3055 may represent multiple processors and the memory 2950, 3050 may represent multiple memories that operate in parallel. In such a case, the local interface 2960, 3060 may be an appropriate network that facilitates communication between any two of the multiple processors, between any processor and any one of the memories, or between any two of the memories etc. The local interface 2960, 3060 may comprise additional systems designed to coordinate this communication, including, for example, performing load balancing. The processor 2955, 3055 may be of electronic or of some other available construction.

It can be appreciated that affiliate device 180, shown in FIG. 1, may utilize a processor, memory, bus, and network interface architecture similar to that depicted for server 100 or customer device 160 as shown in FIGS. 29 and 30, respectively.

Although various systems and applications mentioned above may be depicted as being embodied in software or code executed by general purpose hardware such as processor-based systems as discussed above, as an alternative the same may also be embodied in dedicated hardware or a combination of software/general purpose hardware and dedicated hardware. If embodied in dedicated hardware, such systems and applications can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable circuits such as field programmable gate arrays (FPGAs) or other components, etc.

Although the flowcharts of FIGS. 7, 8, 9 and 26 show a specific order of execution, it is understood that the order of execution may differ from that which is depicted. For example, the order of execution of two or more blocks may be scrambled relative to the order shown. Also, two or more blocks shown in succession in FIGS. 7, 8, 9 and 26 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where various systems and applications described herein comprise software or code, each can be embodied in any tangible, non-transitory computer-readable medium for use by or in connection with an instruction execution system such as, for example, a processor in a computer system or other system. In this sense, such systems or applications may comprise, for example, statements including instructions and declarations that can be fetched from the computer-readable medium and executed by the instruction execution system. In the context of the present disclosure, a "computer-readable medium" can be any tangible, non-transitory medium that can contain, store, or maintain the above-described systems and applications for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, Universal Serial Bus (USB) flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the claims.

What is claimed is:

1. A method for a modular reservation booking system (BS), comprising a processor, a local data store, an availability engine, and a communication interface to communicate with a plurality of remote data stores, to fulfill a hospitality booking request, and correspondingly adapt search input criteria for searching at least one data store, comprising the steps of:

said processor receiving a user request for a hospitality booking from a requesting user computing device (UCD) with a BS processor-populated and user-controlled graphical user interface (GUI), said request encompassing descriptive artifacts for a desired feature reservation, said request including free-form content for said feature;

said availability engine analyzing said requested booking for at least one facility matching said descriptive artifacts in a local data store, and determining said matching facility and a feature scoring for said matching facility based on a facility scoring algorithm encompassing artifact interpretation, wherein said matching facility at least partially conforms to said descriptive artifacts;

said processor updating said local data store with said conformant matching facility and based on said analyzing and determining adaptively reconfiguring said local data store and formulating a revised facility scoring algorithm, wherein said local data store is reconfigured to include at least one field associated with said matching facility which conforms to use for at least some of said descriptive artifacts, wherein said revised facility scoring algorithm includes said facility scoring algorithm revised at least based on said determined feature scoring for said matching facility;

said processor generating for delivery to said requesting UCD said determined conformant matching facility for selection;

said processor searching said local data store for optional additive features, and determining said optional additive features based on a feature scoring algorithm including at least a known correlation between said matching facility and features in a data store associated with at least the matching facility or an associated facility and delivering said optional additive features to said UCD using said GUI;

upon user selection of an entry using said GUI, wherein said entry is at least one of said matching facility or at least one of said optional additive features, said processor delivering authorization to a provider associated with said user selected entry and updating said local data store;

said processor generating a message to a remote data store corresponding to a booking reservation of said selected entry to reconfigure a remote data store associated with said selected entry to include a at least one field associated with said matching facility which conforms to use for said at least some of said descriptive artifacts;

upon receiving confirmation of said booking, said processor delivering a reservation confirmation to the UCD;

said processor updating availability in said local data store and at least said remote data store associated with said selected entry based on said booking's usage; and said processor populating said GUI for subsequent delivery to associated UCDs, including said conformant matching facility as a booking option;

wherein said local data store is structured with facility dimensional artifacts and a location for each said facility; and wherein said availability engine includes a pricing algorithm for pricing bookings based at least on demand, and time utilization for each said facility.

2. The method of claim 1, wherein said feature is or is associated with event space.

3. The method of claim 1, wherein said optional additive features and said matching facility are sourced from different providers.

4. The method of claim 1, wherein said processor determines resource availability and resource pricing for sa; optional additive features by querying at least one remote data store.

5. The method of claim 4, wherein said resource pricing is calculated based on said request, selected features, and determined fees for preparing said features.

6. The method of claim 1, wherein unmatched features are correlated with at least one descriptive artifact for use in a plurality of facilities.

7. The method of claim 1, wherein said feature scoring algorithm is further revised based on trend analysis encompassing prior requests.

8. The method of claim 7, wherein said trend analysis is used to determine predictive demand.

9. The method of claim 1, wherein said artifact interpretation is calculated based on at least user input in combination with dimensional artifacts in inventory parameters in said local data store.

10. The method of claim 1, wherein said matching facility is usable for multiple purposes.

11. A modular reservation booking system (BS) for fulfilling a hospitality request based at least in part on free form entry in a Graphical User Interface (GUI), and correspondingly adapting search input criteria and reconfiguring at least two data stores, comprising:
   a processor;
   a communications interface to communicate with a plurality of remote data stores;
   a local data store; and
   an availability engine;
   wherein said processor is configured to receive a user request for a hospitality booking from a requesting user computing device (UCD) comprising a BS processor-populated and user-controlled graphical user interface (GUI), wherein said request encompassing descriptive artifacts for a desired reservation feature, wherein said request includes free-form content for said desired reservation feature;
   wherein said availability engine is configured to analyze said requested booking for at least one facility matching said descriptive artifacts in said local data store, and is configured to determine said matching facility and a feature scoring for said matching facility based on a facility scoring algorithm encompassing artifact interpretation, wherein said matching facility at least partially conforms to said descriptive artifacts;
   wherein said processor is further configured to adaptively reconfigure, based on said analysis, said local data store and to formulate a revised facility scoring algorithm based on said determined feature scoring for said matching facility and based on said facility scoring algorithm, wherein said local data store is reconfigured to include at least one descriptive field associated with said matching facility which conforms to use for at least some of said descriptive artifacts;
   wherein said processor is further configured to generate for delivery to said GUI said determined conformant matching facility for selection;
   wherein said processor is further configured to search said local data store for optional additive features, and further configured to determine said optional additive features based on a feature scoring algorithm including at least a known correlation between said matching facility and features in a data store associated with at least the matching facility or an associated facility, and further configured to deliver said determined optional additive features to said GUI for selection;
   wherein upon user selection of an entry comprising at least one of said optional additive features or said matching facility, said processor is further configured to deliver an authorization request to a provider associated with said user selected entry and correspondingly update said local data store;
   wherein said processor is further configured to generate a message to a remote data store corresponding to a booking reservation of said selected entry to reconfigure a remote data store associated with said selected entry to include said at least one descriptive field associated with said matching facility which conforms to use for sa at least some of said descriptive artifacts;
   wherein said processor is further configured to deliver a reservation confirmation to the requesting computing device upon receiving confirmation of said booking;
   wherein said processor is further configured to update availability in said local data store and at least said remote data store associated with said selected entry based on said booking's usage;
   wherein said processor is further configured to populate said GUI's content for subsequent delivery to associated UCDs to include said conformant matching facility as a booking option;
   wherein said local data store is structured with facility dimensional artifacts and a location for each said facility; and
   wherein said availability engine is further configured to price bookings using a pricing algorithm based at least on demand, and time utilization for each facility.

12. The system of claim 11, wherein said reservation feature is or is associated with event space.

13. The system of claim 11, wherein the processor is further configured to deliver an order for at least one optional additive feature to a feature provider.

14. The system of claim 11, wherein said optional additive features and said matching facility are sourced from different providers.

15. The system of claim 11, wherein said processor is further configured to determine resource availability and resource pricing for sa optional additive features by querying at least one remote data store.

16. The system of claim 15, wherein said processor is further configured to calculate said resource pricing is based on said request, selected features, and determined fees for preparing said feature.

17. The system of claim 11, wherein unmatched features are correlated with at least one of said descriptive artifacts for use in a plurality of facilities.

18. The system of claim 11, wherein said processor is further configured to revise said feature scoring algorithm based on trend analysis encompassing prior requests.

19. The system of claim 18, wherein said trend analysis is used to determine predictive demand.

20. The system of claim 11, wherein said availability engine is further configured to calculate said artifact interpretation based on at least user input in combination with 5 dimensional artifacts in inventory parameters in said local data store.

* * * * *

UNITED STATES PATENT AND TRADEMARK OFFICE
CERTIFICATE OF CORRECTION

PATENT NO. : 10,074,144 B2
APPLICATION NO. : 15/657919
DATED : September 11, 2018
INVENTOR(S) : Keith Fishberg Page 1 of 1

It is certified that error appears in the above-identified patent and that said Letters Patent is hereby corrected as shown below:

In the Claims

Column 25, Claim 4, Line 10, change "sa" to --said--;
Column 26, Claim 11, Line 24, change "sa" to --said--;
Column 26, Claim 15, Line 55, change "sa" to --said--.

Signed and Sealed this
Thirtieth Day of October, 2018

Andrei Iancu
*Director of the United States Patent and Trademark Office*